United States Patent
Van Nieuwenhove et al.

(10) Patent No.: US 11,981,081 B2
(45) Date of Patent: May 14, 2024

(54) POWDER REMOVAL SYSTEMS AND ASSEMBLIES FOR ADDITIVE MANUFACTURING

(71) Applicant: General Electric Company, Schenectady, NY (US)

(72) Inventors: Stefaan Van Nieuwenhove, Hohenkammer (DE); Sultan Shair, Ismaning (DE); Thomas Kluge, Lenggries (DE); Alexander Hofmann, Lichtenfels (DE); Rene Hertha, Lichtenfels (DE); Alex W. Ariapad, West Chester, OH (US); Hojjat Nasr, West Chester, OH (US); Johannes Hornof, Erding (DE); Nikolaus Mroncz, Dorfen (DE)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 17/152,214

(22) Filed: Jan. 19, 2021

(65) Prior Publication Data
US 2022/0227053 A1  Jul. 21, 2022

(51) Int. Cl.
| | |
|---|---|
| *B29C 64/35* | (2017.01) |
| *B22F 10/68* | (2021.01) |
| *B22F 10/73* | (2021.01) |
| *B29C 64/357* | (2017.01) |
| *B29C 64/393* | (2017.01) |

(Continued)

(52) U.S. Cl.
CPC ............ *B29C 64/35* (2017.08); *B22F 10/68* (2021.01); *B22F 10/73* (2021.01); *B29C 64/357* (2017.08); *B29C 64/393* (2017.08); *B33Y 30/00* (2014.12); *B33Y 50/02* (2014.12)

(58) Field of Classification Search
CPC ..... B29C 64/35; B29C 64/357; B29C 64/393; B22F 10/68; B22F 10/73; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 8,827,681 | B2 | 9/2014 | Chen et al. |
| 9,821,543 | B1 | 11/2017 | Crear et al. |
| 9,827,754 | B2 | 11/2017 | Swartz et al. |

(Continued)

FOREIGN PATENT DOCUMENTS

| | | |
|---|---|---|
| DE | 102014010501 A1 | 1/2016 |
| EP | 3167980 A1 | 5/2017 |

(Continued)

*Primary Examiner* — Ryan M Ochylski
(74) *Attorney, Agent, or Firm* — Dority & Manning, P.A.

(57) ABSTRACT

A powder removal assembly includes a build module comprising module sidewalls and a moveable build plate slidably coupled to the module sidewalls, and an extraction housing removably engaged with the module sidewalls of the build module and defining a turbulence chamber between the build module and the extraction housing. The extraction housing includes one or more sidewalls comprising one or more sidewall fluid flow channels extending through the one or more sidewalls and a top wall coupled to the one or more sidewalls, wherein the one or more sidewall fluid flow channels extend from a position proximate a base of the one or more sidewalls to the top wall.

20 Claims, 21 Drawing Sheets

(51) Int. Cl.
*B33Y 30/00* (2015.01)
*B33Y 50/02* (2015.01)

(56) References Cited

U.S. PATENT DOCUMENTS

| | | |
|---|---|---|
| 10,500,789 B2 | 12/2019 | Fulop et al. |
| 10,543,530 B2 | 1/2020 | Hermann et al. |
| 10,583,606 B2 | 3/2020 | Joerger et al. |
| 10,596,626 B2 | 3/2020 | DeMuth et al. |
| 10,682,704 B2 | 6/2020 | Swanner, Jr. et al. |
| 11,491,720 B2 * | 11/2022 | Jordan .................. B29C 64/165 |
| 2004/0084814 A1 | 5/2004 | Boyd et al. |
| 2017/0036401 A1 | 2/2017 | Donovan et al. |
| 2017/0120530 A1 | 5/2017 | DeMuth et al. |
| 2018/0345600 A1 | 12/2018 | Holford et al. |
| 2019/0039367 A1 * | 2/2019 | Roman .................. B29C 64/35 |
| 2019/0054697 A1 | 2/2019 | Alonso et al. |
| 2019/0176402 A1 | 6/2019 | Hofmann et al. |
| 2019/0374983 A1 | 12/2019 | Barua et al. |
| 2021/0046519 A1 | 2/2021 | Go et al. |

FOREIGN PATENT DOCUMENTS

| | | |
|---|---|---|
| WO | 2019209310 A1 | 10/2019 |
| WO | 2019237007 A1 | 12/2019 |
| WO | 2020076295 A1 | 1/2020 |

* cited by examiner

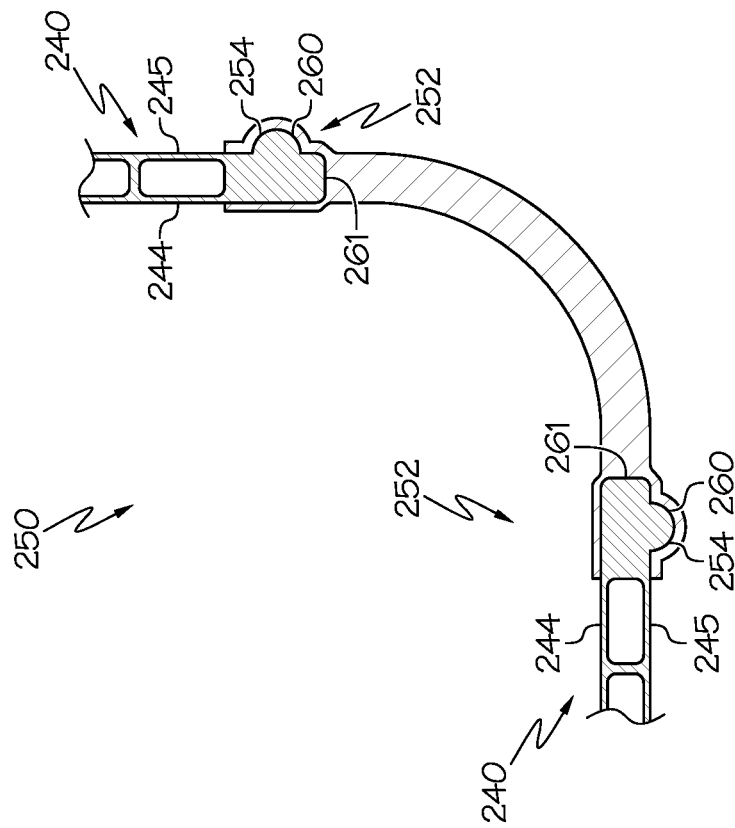
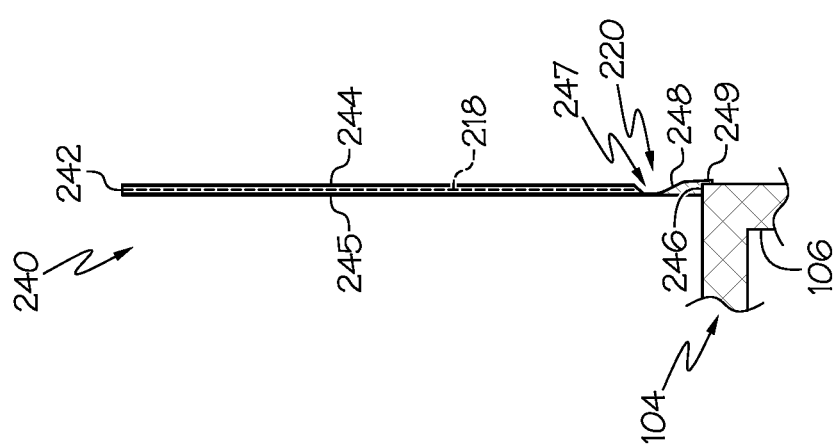
FIG. 3D
FIG. 3C

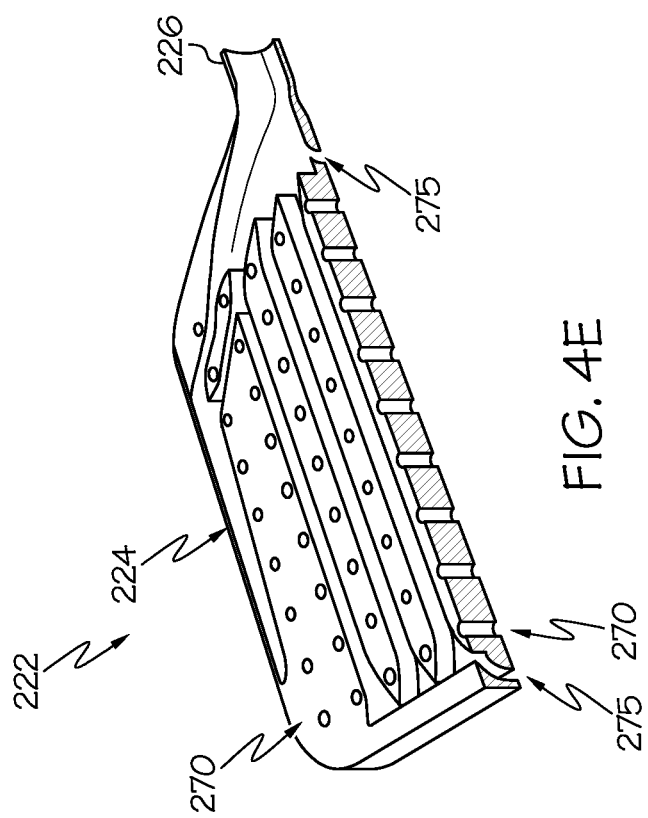

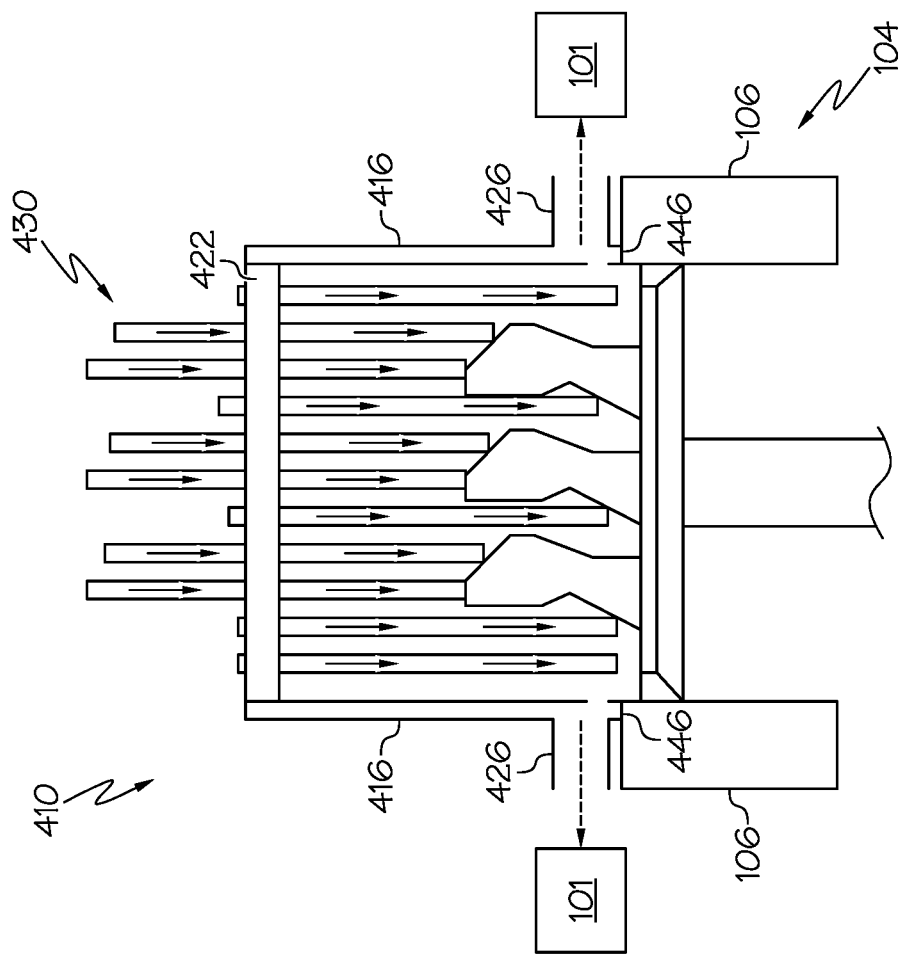

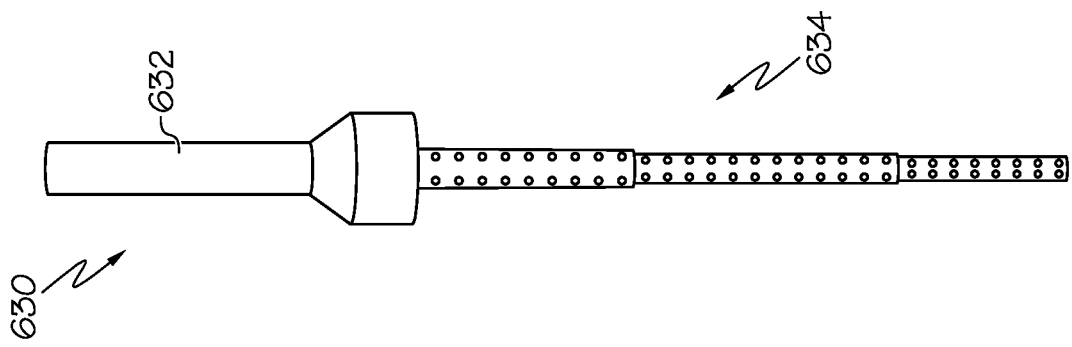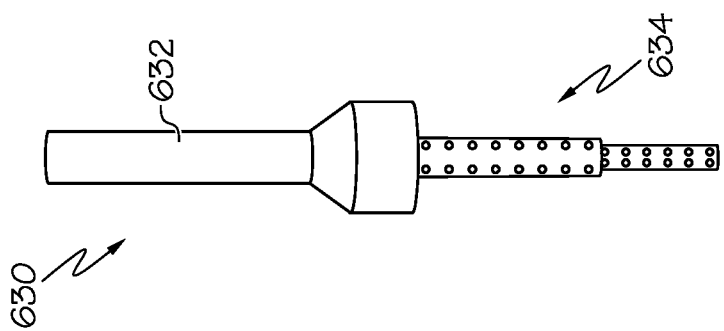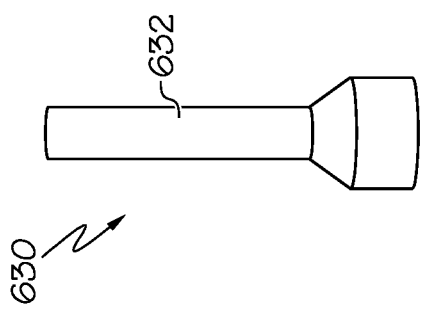
FIG. 10C
FIG. 10B
FIG. 10A

POWDER REMOVAL SYSTEMS AND ASSEMBLIES FOR ADDITIVE MANUFACTURING

TECHNICAL FIELD

The present specification generally relates to powder removal systems and assemblies and, more specifically, powder removal systems and assemblies for additive manufacturing procedures using a powder bed.

BACKGROUND

Various additive manufacturing methods, including selective laser melting (SLS), direct metal laser melting (DMLM), and binder jet additive manufacturing, include selective fusion of powder in a powder bed to manufacture a three-dimensional (3D) object. However, upon completion of a build, the object is surrounded by loose powder, which may require a technician to manually remove the loose powder using their hands and/or a manually positioned vacuum. These process can be time consuming, labor intensive, ergonomically challenging, leading to risk of powder contamination and potential production inefficiencies.

Accordingly, a need exists for alternative systems and assemblies for removing powder from a powder bed.

SUMMARY

In a first aspect A1, a powder removal assembly includes a build module comprising module sidewalls and a moveable build plate slidably coupled to the module sidewalls, and an extraction housing removably engaged with the module sidewalls of the build module and defining a turbulence chamber between the build module and the extraction housing. The extraction housing includes one or more sidewalls comprising one or more sidewall fluid flow channels extending through the one or more sidewalls and a top wall coupled to the one or more sidewalls, wherein the one or more sidewall fluid flow channels extend from a position proximate a base of the one or more sidewalls to the top wall.

In a second aspect A2, a powder removal assembly includes the powder removal assembly according to the first aspect A1 further includes a vacuum pump fluidicly coupled to a vacuum port formed within the top wall.

In a third aspect A3, a powder removal assembly includes the powder removal assembly according to any preceding aspect, wherein the one or more sidewalls define one or more fluid inlets for channeling fluid from the one or more sidewall fluid flow channels into the turbulence chamber.

In a fourth aspect A4, a powder removal assembly includes the powder removal assembly according to any preceding aspect, wherein the extraction housing includes a plurality of tubes coupled to the top wall and extendable in a direction into and out of the turbulence chamber.

In a fifth aspect A5, a powder removal assembly includes the powder removal assembly according to any preceding aspect, wherein at least a portion of the plurality of tubes are configured to deliver one or more fluid streams into the turbulence chamber.

In a sixth aspect A6, a powder removal assembly includes the powder removal assembly according to any preceding aspect, wherein the top wall comprises a plurality of converging flow channels defining a vacuum outtake manifold, and the one or more sidewall fluid flow channels are fluidicly coupled to at least one of the plurality of converging flow channels.

In a seventh aspect A7, a powder removal assembly includes the powder removal assembly according to any preceding aspect, wherein each of the plurality of tubes extends through the top wall at a position between the plurality of converging flow channels.

In an eighth aspect A8, a powder removal assembly includes the powder removal assembly according to any preceding aspect, wherein the plurality of tubes are telescoping tubes.

In a ninth aspect A9, a powder removal assembly includes an extraction housing configured to be arranged on or within a build module to define a turbulence chamber between the build module and the extraction housing and to define one or more fluid flow channels for removal of one or more fluid streams within the turbulence chamber, the extraction housing comprising a top wall, and a plurality of tubes slidably coupled to the top wall so as to be slidable in a direction into and out of the turbulence chamber.

In a tenth aspect A10, a powder removal assembly includes the powder removal assembly according to any preceding aspect, wherein at least a portion of the plurality of tubes defines a flow path for channeling the one or more fluid streams into the turbulence chamber.

In an eleventh aspect A11, a powder removal assembly includes the powder removal assembly according to any preceding aspect, wherein the extraction housing further includes one or more sidewalls, each of the one or more sidewalls comprising one or more sidewall fluid flow channels encased within the one or more sidewalls.

In a twelfth aspect A12, a powder removal assembly includes the powder removal assembly according to any preceding aspect the top wall includes a plurality of converging flow channels defining a vacuum outtake manifold, and the one or more sidewall fluid flow channels are fluidicly coupled to the vacuum outtake manifold.

In a thirteenth aspect A13, a powder removal assembly includes the powder removal assembly according to any preceding aspect, wherein a portion of the one or more sidewall fluid flow channels are configured to deliver one or more fluid streams into the turbulence chamber.

In a fourteenth aspect A14, a powder removal assembly includes the powder removal assembly according to any preceding aspect, wherein the extraction housing includes a lip configured to maintain a position of the extraction housing relative to the build module.

In a fifteenth aspect A15, an automated powder removal system includes a build module for additive manufacturing, and an automated powder removal station operable to receive the build module. The automated powder removal station includes an extraction housing configured to be engaged with the build module and remove powder from the build module, one or more positioning actuators configured to align the extraction housing and the build module with one another, a vacuum pump operatively coupled to the extraction housing, and a control unit communicatively coupled to the vacuum pump and the one or more positioning actuators. The control unit causes the one or more positioning actuators to align the extraction housing with the build module, and automatically operates the vacuum pump to cause the powder to be removed from the build module through the extraction housing.

In a sixteenth aspect A16, an automated powder removal system includes the automated powder removal system according to any preceding aspect, further including one or more transfer devices communicatively coupled to the control unit, and at least one of a manual powder removal station and a part removal station, wherein the control unit is configured to operate the one or more transfer devices to transfer the build module from the automated powder removal station to the at least one of the manual powder removal station and the part removal station after at least a portion of the powder is removed from the build module.

In a seventeenth aspect A17, an automated powder removal system includes the automated powder removal system according to any preceding aspect, wherein the extraction housing defines a turbulence chamber between the build module and the extraction housing and defines one or more fluid flow channels for removal of one or more fluid streams within the turbulence chamber.

In an eighteenth aspect A18, an automated powder removal system includes the automated powder removal system according to any preceding aspect, wherein the extraction housing includes one or more sidewalls comprising one or more sidewall fluid flow channels, and a top wall coupled to the one or more sidewalls, wherein the one or more sidewall fluid flow channels extend from a position proximate a base of the one or more sidewalls to the top wall.

In a nineteenth aspect A19, an automated powder removal system includes the automated powder removal system according to any preceding aspect, wherein the one or more sidewalls comprise one or more fluid inlets for channeling fluid from the one or more sidewall fluid flow channels into the turbulence chamber.

In a twentieth aspect A20, an automated powder removal system includes the automated powder removal system according to any preceding aspect, wherein the one or more fluid flow channels comprises a plurality of fluid inlet channels and a plurality of fluid outlet channels.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3C schematically depicts a cross-section side view of a wall panel of the one or more sidewalls of FIG. 3A engaged with a build module, according to one or more embodiments shown and described herein;

FIG. 3D schematically depicts connections between wall panels and a corner of the one or more sidewalls of FIG. 3A, according to one or more embodiments shown and described herein;

FIG. 4E schematically depicts a cross-sectional view of the top wall of FIG. 4C taken along line C-C depicted in FIG. 4C, according to one or more embodiments shown and described herein;

FIG. 8 schematically depicts another embodiment of an extraction housing, according to one or more embodiments shown and described herein;

FIG. 10A schematically depicts an embodiment of a telescoping tube, according to one or more embodiments shown and described herein;

FIG. 10B schematically depicts the telescoping tube of FIG. 10A telescoping to an extended position, according to one or more embodiments shown and described herein;

FIG. 10C schematically depicts the telescoping tube of FIG. 10A fully extended to the extended position, according to one or more embodiments shown and described herein;

DETAILED DESCRIPTION

The figures generally depict various embodiments of powder removal systems and assemblies. The powder removal systems and assemblies may generally be incorporated into additive manufacturing assemblies and procedures to improve removal of unbound powder from a powder bed of a build module and from an object. For example, embodiments may include an extraction housing that engages the side walls of a build module to define a turbulence chamber between the build module and the extraction housing. Various fluid flow channels provided via the extraction housing may be used to direct one or more fluid streams into and out of the turbulence chamber to disturb unbound powder, entrain the unbound powder within one or more fluid streams, and remove the unbound powder from the turbulence chamber/build module. Such removal may be automated as part of an automated powder removal system. Accordingly, systems and assemblies as described herein improve powder removal procedures by, for example, decreasing powder removal time, limiting powder and/or part exposure to external contaminants, etc., thereby improving additive manufacturing efficiency and/or quality. The various embodiments of the powder removal systems and assemblies and their benefits will be described in more detail herein.

Figure 1B:
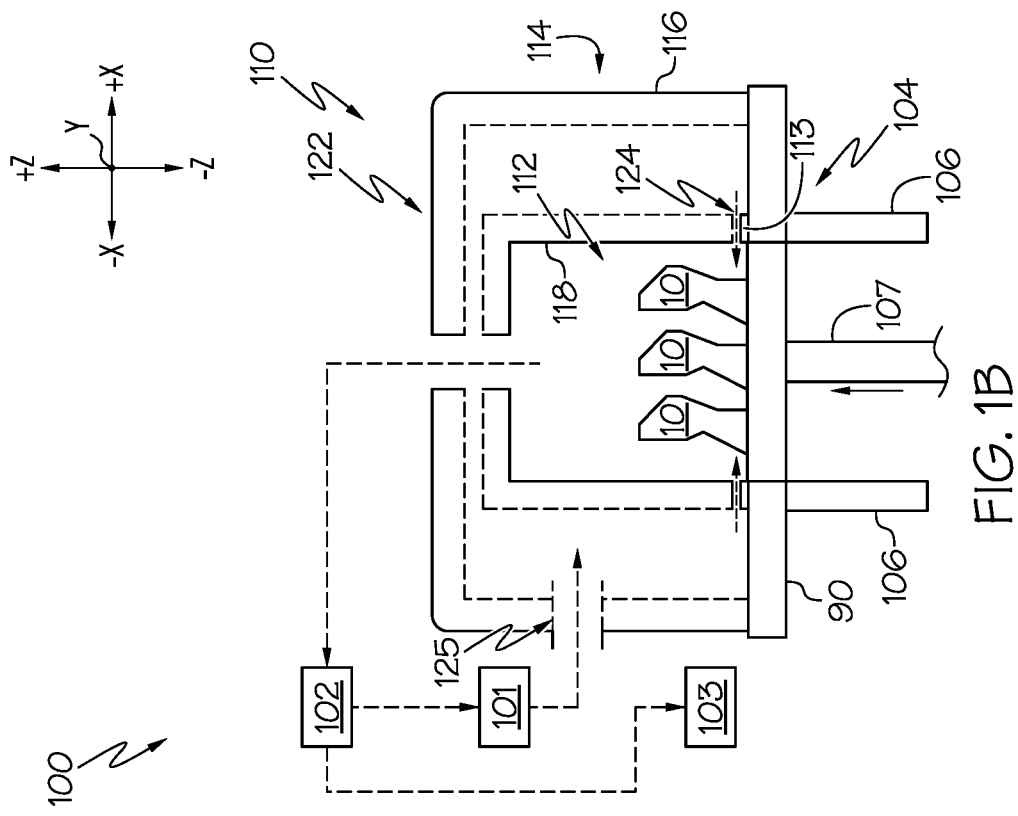
FIG. 1B schematically depicts the powder removal system of FIG. 1A with the loose, unbound powder substantially removed, according to one or more embodiments shown and described herein.
Figure 1A:
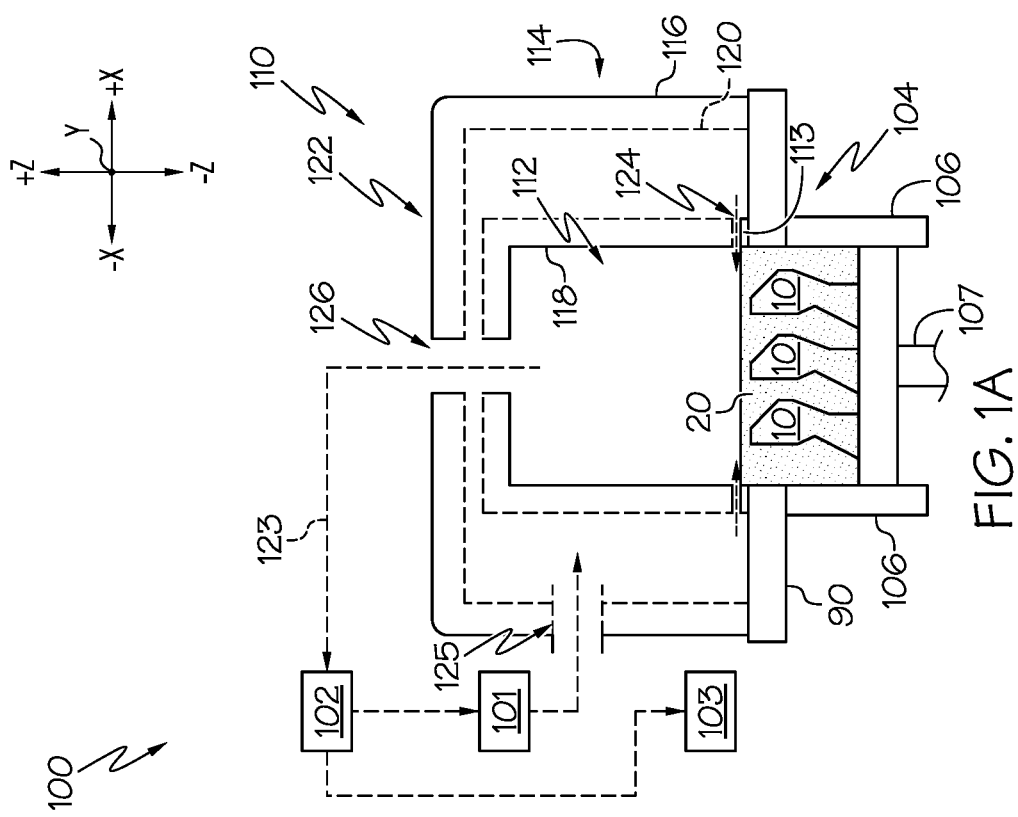
FIG. 1A schematically depicts an powder removal system, according to one or more embodiments shown and described herein.

FIGS. 1A and 1B schematically depict an embodiment of a powder removal system 100. The powder removal system 100 may generally include an extraction housing 110 and a vacuum pump 101 fluidically coupled to the extraction housing 110. The powder removal system 100 may further include a build module 104, a powder separator 102, and a powder container 103. It is noted that a greater or fewer number of components may be included without departing from scope of the present disclosure. It should be understood that phrases "a," "an,", and/or "one or more" may be interchangeably used throughout this disclosure and are not to be limited to indicating only a single component but may indicate more than one such component, unless otherwise noted.

The build module 104 may be any structure which may be used with an additive manufacturing apparatus (e.g., SLM, DMLM, binder jet, etc.) in which a powder bed including loose (i.e., unbound) powder 20 (e.g., metal, ceramic, and/or plastic particles) may be positioned for manufacturing of a three-dimensional object 10 via selective fusion of the powder 20. For example, the build module 104 may define a chamber in which the powder 20 is positioned. To define the chamber, the build module 104 may generally include one or more module sidewalls 106 and a moveable build plate 108 which may be slidably coupled to the one or more module sidewalls 106. An actuator 107 (e.g., a linear actuator) may engage the moveable build plate 108 to move the moveable build plate 108 along a vertical axis (e.g., in the +/−Z direction of the depicted coordinate axes). For example, during manufacturing, the build module 104 may be positioned in proximity to a fusion device (e.g., a laser or print head; not depicted). A layer of powder 20 may be deposited on the moveable build plate 108 and the fusion device may selectively fuse portions of the powder 20 to form a portion or layer of a printed object 10. The actuator may move the moveable build plate 108 down (i.e., in the −Z direction of the depicted coordinate axes) and more powder 20 may be deposited on the previous layer to allow for additional powder 20 to be fused to build the desired printed object 10 layer by layer. Once the desired printed object 10 is built, the surrounding loose powder 20 may be removed from the build module 104. As noted above, this may be done using brushes, shovels, hands, and or hand-positioned vacuums. However, such processes may be time-consuming and/or tedious, leading to manufacturing inefficiencies.

Figure 2B:
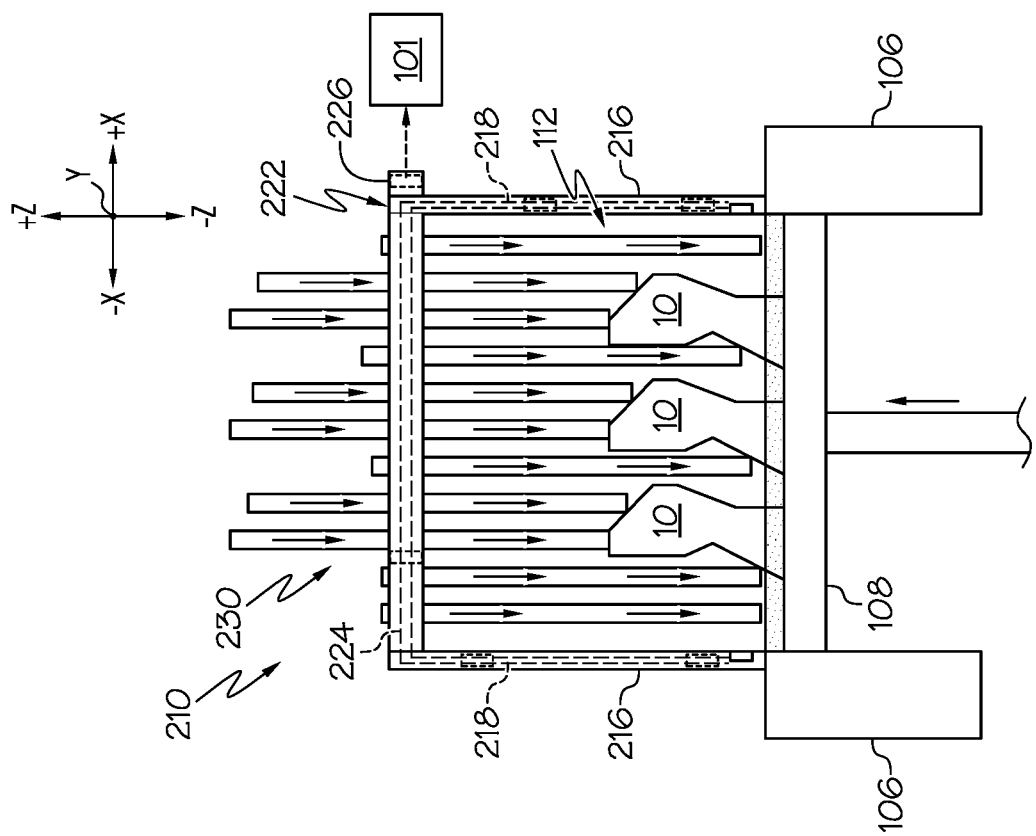
FIG. 2B schematically depicts the powder removal system of FIG. 2A with the loose powder in the process of being removed, according to one or more embodiments shown and described herein.
Figure 2A:
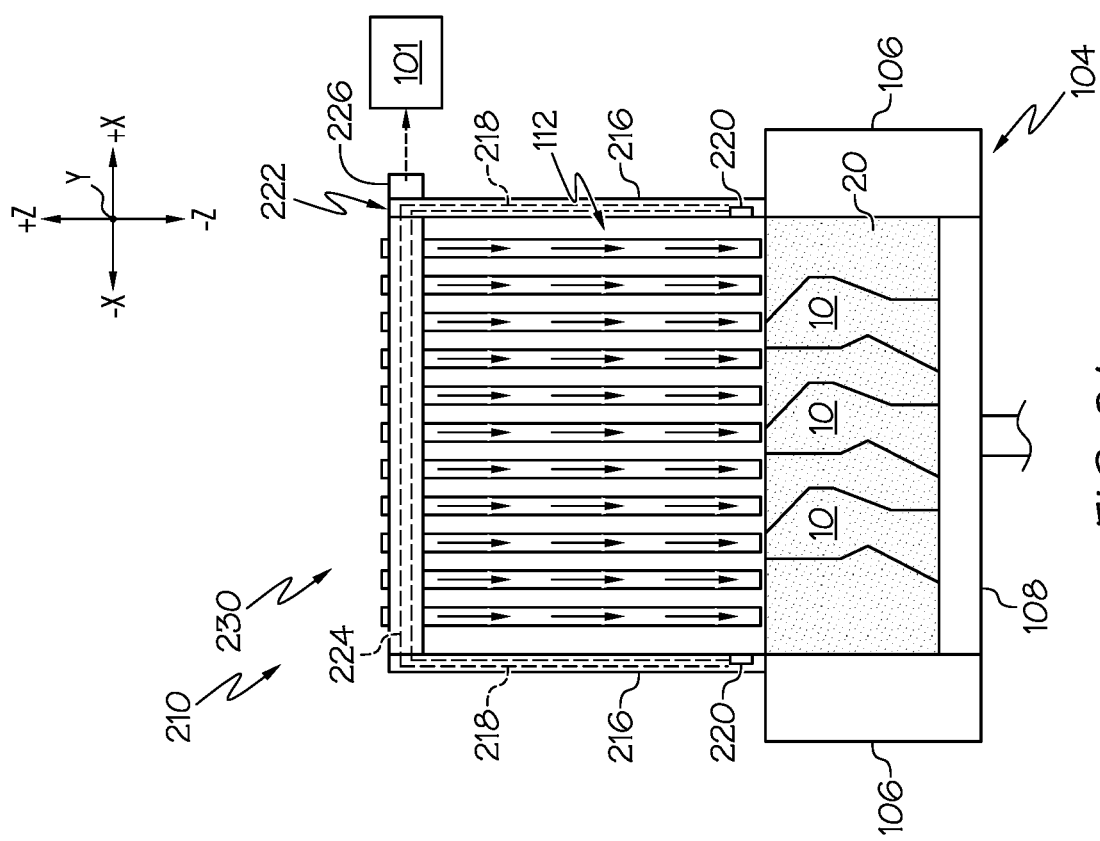
FIG. 2A schematically depicts an powder removal system having a plurality of sliding tubes, according to one or more embodiments shown and described herein.
Figure 2D:
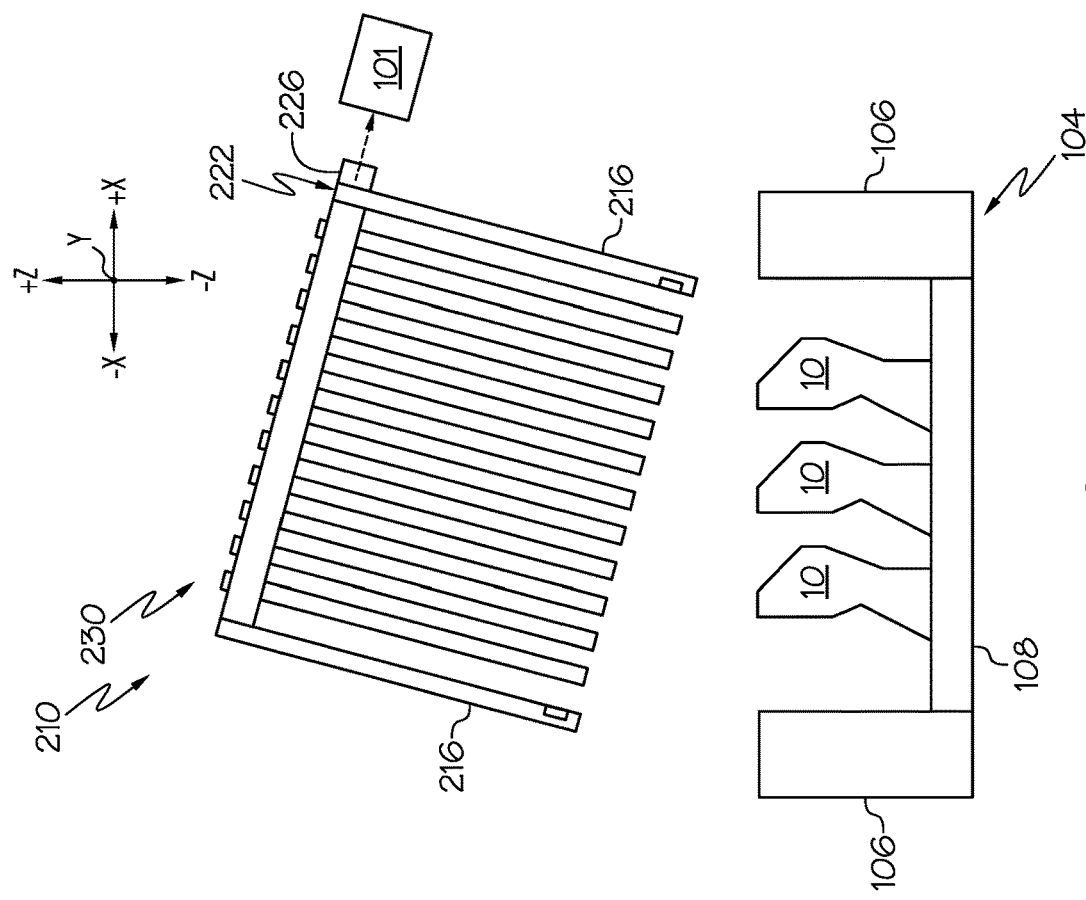
FIG. 2D schematically depicts removal of an extraction housing from a build module, according to one or more embodiments shown and described herein.
Figure 2C:
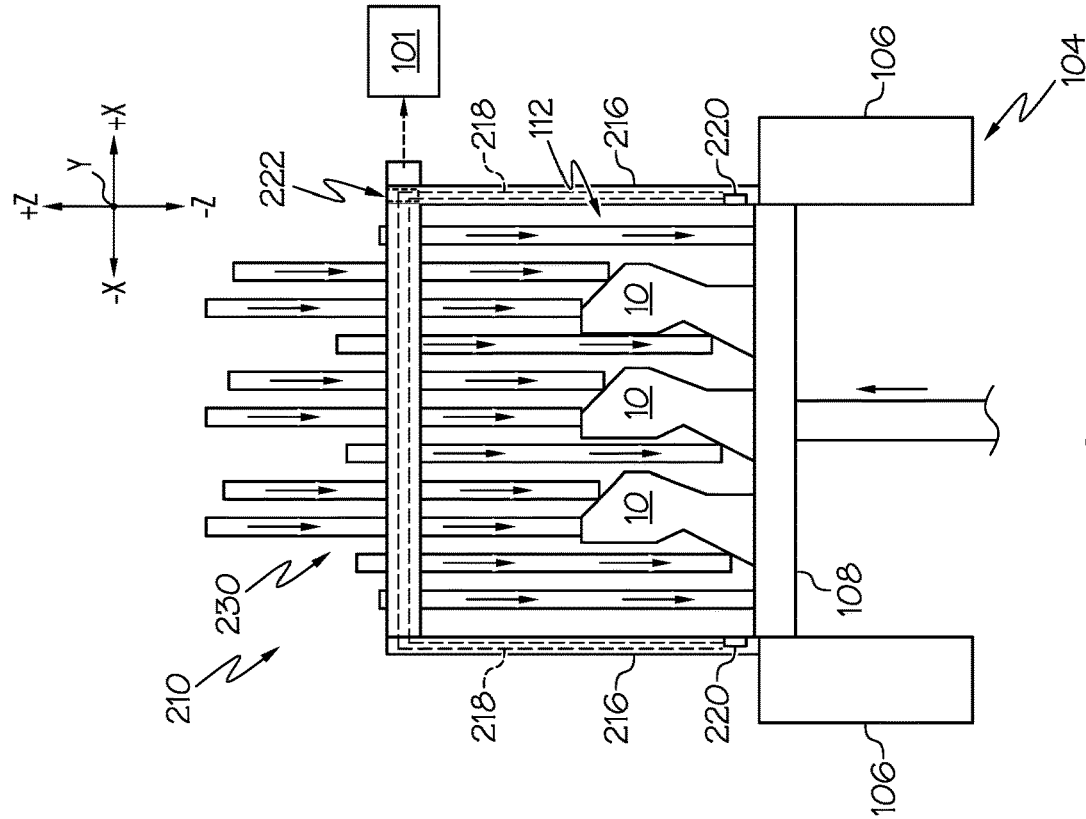
FIG. 2C schematically depicts the powder removal system of FIG. 2A with the loose powder substantially removed, according to one or more embodiments shown and described herein.

To aid in removal of the loose powder 20 from the build module 104, the extraction housing 110 may be removably engaged with the build module 104 or vice versa. For example, the extraction housing 110 may be engaged with the module sidewalls 106 of the build module 104. Such engagement may be direct or indirect. For example, such as illustrated in FIG. 1A, a horizontal wall 90 may form part of an additive manufacturing apparatus, a powder removal station, and/or the build module 104, and may be positioned above and/or in contact with the module sidewalls 106. In other embodiments, the extraction housing 110 may rest directly on the module sidewalls 106, such as is shown in FIGS. 2A-2C. The extraction housing 110, when engaged with the build module 104, defines a turbulence chamber 112 between the extraction housing 110 and the build module 104. During powder removal, in some embodiments, the moveable build plate 108 moves vertically to decrease a volume of the turbulence chamber 112 as the powder 20 is removed. However, in other embodiments, such as will be described in greater detail herein, the extraction housing 110 moves relative to the build module 104 to decrease a volume of the turbulence chamber 112 during powder removal. In yet further embodiments, only portions of the extraction housing 110 will move into and/or out of the turbulence chamber 112 during powder extraction.

The extraction housing 110 may generally define a structure or combination of structures configured to provide one or more fluid flow channels or paths which provide for the inlet of one or more fluid streams and/or the outlet of one of more fluid streams carrying entrained powder 20. For example, the extraction housing 110 may comprise one or more sidewalls 114 defining one or more sidewall fluid flow channels 120 extending through the sidewall. For example, each of the one or more sidewalls 114 may have an outer surface 116 and inner surface 118. The one or more sidewalls 114 may together define an enclosed lateral perimeter of the turbulence chamber 112 which may be substantially square, round, oval, or any other shape. It is noted that, while in some embodiments, the one or more sidewalls 114 may be an integral unit, in further embodiments, the one or more sidewalls 114 may be formed via an inner housing and an outer housing that are positionable with respect to one another and the one or more sidewall fluid flow channels 120 may be formed via the space between the inner housing and the outer hosing. In some embodiments, the outer housing may be sealed around the inner housing to maintain an inert environment within the turbulence chamber 112. In some embodiments, there may be no outer housing. In such embodiments the only sidewall fluid flow channels may extend through the inner housing, which may allow for intake of environmental air.

Still referring to FIGS. 1A and 1B, the one or more sidewall fluid flow channels 120 formed within the one or more sidewalls 114 may extend from a position proximate a base 113 of the one or more sidewalls 114 to a top wall 122 coupled to the one or more sidewalls and defining the vertical extent of the turbulence chamber 112. At the position proximate the base 113, one or more fluid inlets 124 may be formed providing fluid communication between the one or more sidewall fluid flow channels 120 and the turbulence chamber 112. The one or more fluid inlets 124 may be sized and shaped to provide a desired flow rate into (or, in some embodiments, out of) the turbulence chamber 112. The one or more fluid inlets 124 may include a plurality of fluid inlets 124 spaced about a perimeter of extraction housing 110. The one or more fluid inlets 124 may be have geometric shape (e.g., round, square, rectangular, etc.). It is noted that while the one or more fluid inlets 124 are illustrated as being parallel to the horizontal axis of the depicted coordinate axes, in some embodiments, the one or more fluid inlet may be angled relative to the horizontal axis. For example, the one or more fluid inlets 124, or a portion thereof, may be angled toward the powder 20 or toward the moveable build plate 108. An intake fluid port 125 may be formed within one or more of the top wall 122 and the one or more sidewalls 114. The intake fluid port 125 may allow for fluid to flow into the one or more sidewall fluid flow channels 120, in response to drawing of fluid from the turbulence chamber 112 via the vacuum pump 101.

In the illustrated embodiment, the one or more sidewalls 114 may be engaged with the build module 104, e.g., through the horizontal wall 90 and/or the module sidewalls 106. The one or more sidewalls 114 may be sealed to the horizontal wall 90 and/or the module sidewalls 106 to ensure a gas-tight interface. For example, sealing material (e.g., a polymer strip) may be coupled to the base 113 of the one or more sidewalls to provide a seal. Maintaining a seal between build module 104 and the extraction housing 110 may prevent fluid leakages and/or maintain a desired environment within the build module 104. For example, in some embodiments, the powder 20 may be a reactive material, accordingly it may be desirable to maintain an inert environment within the turbulence chamber 112.

Still referring to FIGS. 1A and 1B, the top wall 122 may define a vacuum port 126 which provides fluidic communication into the turbulence chamber 112 with the vacuum pump 101. For example, one or more fluid conduits 123 (e.g., hose, piping, etc.), represented via dashed lines, may fluidicly couple the vacuum port 126 to the vacuum pump 101. The vacuum pump 101 may be operated to pull fluid (e.g., air, inert gas, etc.) and loose powder 20 out of the turbulence chamber 112 through the vacuum port 126, leaving the printed object 10 positioned on the moveable build plate 108. The vacuum port 126 may be sized and shaped to provide a desired flow rate out the turbulence chamber 112. In some embodiments, the vacuum port 126 may include a plurality of vacuum ports. In some embodiments, such as will be described in greater detail herein, multiple vacuum ports may be provided which may all be fluidly coupled to one or more vacuum pumps 101. In some embodiments, a vacuum port 126 may be positioned within the one or more sidewalls 114 instead of, or in addition to, the top wall 122.

The vacuum pump 101 may be any type of commercially available vacuum pump 101 which provides sufficient gas volume flow (e.g., blowers, claw pumps, rotary vane pump, etc.). As should be understood, the volume flow may depend on a plurality of factors, including but not limited, system constraints, the size of the build, powder type, etc. As noted above, the vacuum pump 101 is fluidicly coupled to the vacuum port 126 via the one or more fluid conduits 123. A powder separator 102 may be positioned along the one or more fluid conduits 123 for separating powder 20 from the fluid stream prior to entering the vacuum pump 101 and being recirculated through the extraction housing 110. The powder separator 102 may be any commercially available powder separator 102 such as, but not limited to, cyclonic or filter based powder separators. The powder separator 102 may direct the powder 20 separated from the fluid stream being pulled from the turbulence chamber 112 into the powder container 103, which may be any type of receptacle suitable for holding powder 20. It is contemplated that the separated powder 20 within the receptacle may be recycled in further printing processes, disposed of, or the like. In some embodiments, the powder may be further separated into powder for recycling and powder for disposal using, for example, a sieve or filter.

In the illustrated embodiment of FIGS. 1A and 1B, after a printed object 10 is completed, the extraction housing 110 may be placed over and/or in contact with the build module 104. Placement of the extraction housing 110 may be manual or automated via one or more positioning actuators (e.g., a robotic arm, or the like), which will be described in greater detail herein. In some embodiments, placement of the extraction housing 110 may be automatic, via a control unit, in response to completion of a printed article 10. Once positioned, the vacuum pump 101 may be operated via the control unit and/or an input from a user (e.g., such as through one or more user interfaces including but not limited to touchscreens, buttons, toggles, microphones, or the like) communicatively coupled to the control unit. Operation of the vacuum pump 101 may draw a fluid stream from the turbulence chamber 112 through the vacuum port 126. Drawing a fluid stream from the turbulence chamber 112, in turn, draws one or more fluid streams through the intake fluid port 125 into the one or more sidewall fluid flow channels 120, and out of the one or more sidewall fluid flow channels 120 through the one or more fluid inlets 124 into the turbulence chamber 112, where the one or more fluid streams impinge the powder 20. Impingement of the powder 20 causes turbulence within the turbulence chamber 112, and entrains powder 20 within the one or more fluid streams. The entrained powder 20 may then be removed from the turbulence chamber 112 via the vacuum pump 101 through the vacuum port 126.

In some embodiments, the powder removal system 100 may be a closed system, where fluid is recirculated through the extraction housing 110 to maintain an inert environment. For example, fluid flowing to the vacuum pump 101 may be returned to the intake fluid port 125 where it is recirculated through the extraction housing 110 and turbulence chamber 112. In other embodiments, atmospheric fluid may be drawn into the intake fluid port 125. In yet further embodiments, compressed fluid may be provided through the intake fluid port 125 to supplement flow created via the vacuum pump 101. Fluids can include, but are not limited to, air, nitrogen, argon, or the like. In yet further embodiments, it is contemplated that there may be multiple intake fluid ports and/or vacuum ports which may be independently plumbed to allow for selective fluid flow profiles through the extraction housing 110 and the turbulence chamber 112.

As noted above, the velocity of the fluid entering through the one or more fluid inlets 124 causes the powder 20 within the build module 104 to be agitated and entrained within the one or more fluid streams being pulled through the extraction housing 110, resulting in powder 20 being removed from turbulence chamber 112 through the vacuum port 126. During powder removal, the moveable build plate 108 may be moved up as illustrated in FIG. 1B to allow substantially all of the loose powder 20 within the turbulence chamber 112 to be impinged via one or more fluid streams entering the turbulence chamber 112 through the one or more fluid inlets 124, entrained within the one or more fluid streams, and removed through the vacuum port 126. The moveable build plate 108 may move continuously during powder removal in the +Z direction of the depicted coordinate axes until the majority or substantially all of the powder 20 is removed and/or the printed object 10 is positioned entirely within the extraction housing 110. Accordingly, the extraction housing 110 may have an internal height equal to greater than a height of the printed object 10 or a height that is equal to a maximum depth of the build module 104.

Once powder removal is complete or substantially complete, the extraction housing 110 may be removed from the build module 104 to allow for further processing and/or removal of the printed object 10. In some embodiments, the extraction housing 110 may be automatically removed via one or more positioning actuators controlled via a control unit. In yet further embodiments, and as will be described in further detail herein, after powder removal, the build module 104 may instead be removed from the extraction housing 110 and moved to one or more processing stations.

It is noted that in the above embodiment, the powder 20 is drawn via vacuum pressure through the top wall 122. However, in some embodiments, the powder 20 may be drawn via vacuum pressure through the one or more sidewalls 114. For example, a vacuum pump 101 may instead be coupled to the fluid intake port 125 and draw fluid out of the turbulence chamber 112 through the one or more sidewall fluid flow channels 120, which, in turn, may draw fluid through the top wall port 126, which may instead be used to draw air into the turbulence chamber instead of being coupled to a vacuum pump. Moreover, in the above-described embodiment, fluid flow through the one of more sidewall fluid flow channels 120 is generated via operation of the vacuum pump 101. However, in some embodiments, flow may instead be generated via a compressor that delivers compressed gas through the one or more sidewall fluid flow channels 120. For example, a compressor may force fluid into the one or more sidewall fluid flow channels 120, which may exit the one or more sidewall fluid flow channels 120 through the one or fluid inlets 124. Suction via the vacuum pump 101, may draw the fluid out of the turbulence chamber 112 through the vacuum port 126.

Additional embodiments will now be described in greater detail below. It is noted that the following embodiments may operate in a substantially similar manner to that described above with respect to the embodiment illustrated in FIGS. 1A and 1B. Accordingly, the above description may be applicable to each of the embodiments described below unless otherwise noted or apparent.

Referring now to FIGS. 2A-2D, another embodiment of an extraction housing 210 fluidically coupled to a vacuum pump 101 is schematically depicted. It is noted that while the powder separator 102 and powder container 103 are not presently depicted, they may be included in a manner similar to that discussed above. The extraction housing 210 is similar to the extraction housing 110 described above, including one or more sidewalls 216 and a top wall 222. Accordingly, when mounted to a build module 104, the extraction housing 210 and the build module 104 form an enclosed turbulence chamber 112 therebetween. However, in the present embodiment, a plurality of tubes 230 are coupled to the top wall and extendable into and/or out of the turbulence chamber 112.

As with the above-described embodiment, the one or more sidewalls 216 may define one or more sidewall fluid flow channels 218 encased within the one or more sidewalls 216 each having a fluid inlet 220. The one or more sidewall fluid flow channels 218 may be used for either the intake of one or more fluid streams into the turbulence chamber 112 and/or the outtake of one or more fluid streams from the turbulence chamber 112. For example, the one or more sidewall fluid flow channels 218, or a portion thereof may be fluidicly coupled to the vacuum pump 101 to pull one or more fluid streams and powder 20 entrained in the one or more fluid streams through the one or more sidewall fluid flow channels 218. In other embodiments, such as described with respect to FIGS. 1A and 1B, the one or more sidewall fluid flow channels 218, or a portion thereof, may deliver one or more fluid streams through the one or more sidewall fluid flow channels 218 into the turbulence chamber 112. In some embodiments, the one or more sidewalls 216 may also include fluid inlets to allow for fluid to be drawn into the turbulence chamber, such as described in the embodiments above.

Formed within the top wall 222 may be one or more top wall fluid flow channels 224 which may be fluidically coupled to the one or more sidewall fluid flow channels 218 such that the fluid streams and/or powder may flow from the one or more sidewall fluid flow channels 218 into the one or more top wall fluid flow channels 224. One or more vacuum ports 226 are formed within or coupled to top wall 222 and fluidically couple the one or more top wall fluid flow channels 224 with the vacuum pump 101. Accordingly, one or more fluid streams, along with entrained powder 20, may be drawn out of the extraction housing 210 through the one or more sidewalls 216 and the top wall 222 and out of the extraction housing 210 via the vacuum pump 101.

The plurality of tubes 230 may extend through the top wall 222. For example, the plurality of tubes 230 may be rigid or flexible tubes each defining a flow path therethrough. For example, at least a portion of the plurality of tubes 230 may define a plurality of fluid inlet paths into the turbulence chamber 112 such that the plurality of tubes 230 may channel one or more fluid streams into the turbulence chamber 112 in response to the vacuum pump 101 drawing fluid through the turbulence chamber 112. The plurality of tubes 230 may be slidably coupled to the top wall 222 such that as the moveable build plate 108 moves upward, thereby reducing the volume of the turbulence chamber 112, the tubes which contact the printed object(s) 10, may slide upward to accommodate the printed object(s) 10, as illustrated in FIGS. 2B and 2C. In some embodiments, such as where the plurality of tubes 230 are flexible, the tubes may bend or flex out of the way as they contact the printed object(s) 10.

As noted above, the vacuum pump 101 may be fluidically coupled to the one or more vacuum ports 226 of the top wall 222, though it is contemplated that the one or more vacuum ports 226 may also or instead be formed in the one or more sidewalls 216. As with the previous embodiment, the extraction housing 210 may be sealed to the build module 104 with an airtight seal. Due to the air tight seal, operation of the vacuum pump 101 may draw fluid within the turbulence chamber 112 through the one or more sidewall fluid flow channels 218, which may, in turn, generate fluid flow through the plurality of tubes 230. Due to the vacuum pressure the plurality of tubes 230 may act as impingement jets to impinge one or more fluid streams onto the powder 20 within the turbulence chamber to disrupt the powder 20 and entrain the powder 20 into own or more fluid streams which may be pulled via the vacuum pump 101 out of the turbulence chamber 112 and extraction housing 210. As above, during extraction, the moveable build plate 108 may be moved upward (as illustrated in FIGS. 2B and 2C), thereby reducing a volume of the turbulence chamber 112. As noted above, as tubes 230 contact a printed article 10 positioned on the moveable build plate 108, the contacted tubes may slide relative to the top wall 222 to provide space for the printed article 10 to continue to move upward as the powder 20 is removed from the turbulence chamber 112. Once powder removal is complete, the extraction housing 210 may be removed (e.g., manually or via one or more positioning actuators), as illustrated in FIG. 2D.

It is noted that in some embodiments, the plurality of tubes 230, or a portion thereof, may instead be coupled to one or more vacuum pumps 101 to draw entrained powder 20 out of the turbulence chamber 112 through flow channels defined by the plurality of tubes 230. In such embodiments, at least a portion of the one or more sidewall fluid flow channels 218 and/or the one or more top wall fluid flow channels 224 may deliver one or more fluid streams into the turbulence chamber 112, such as described with respect FIGS. 1A and 1B.

Figure 3B:
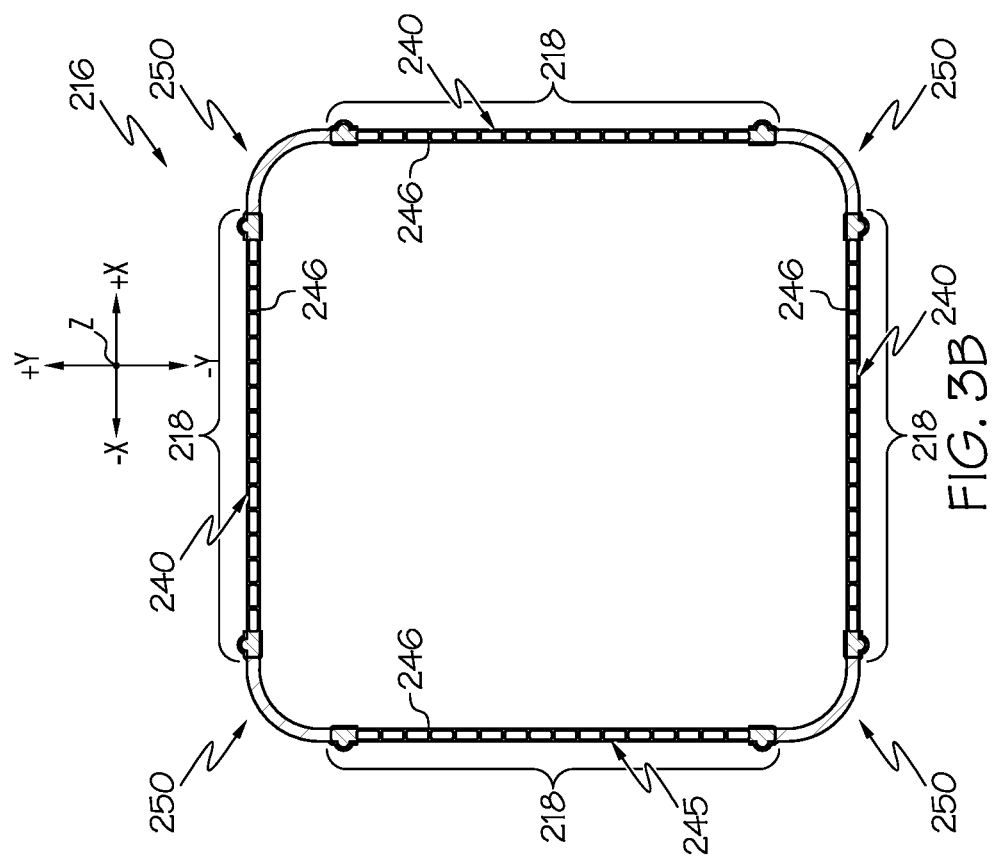
FIG. 3B schematically depicts a top view of the one or more sidewalls of FIG. 3A, according to one or more embodiments shown and described herein.
Figure 3A:
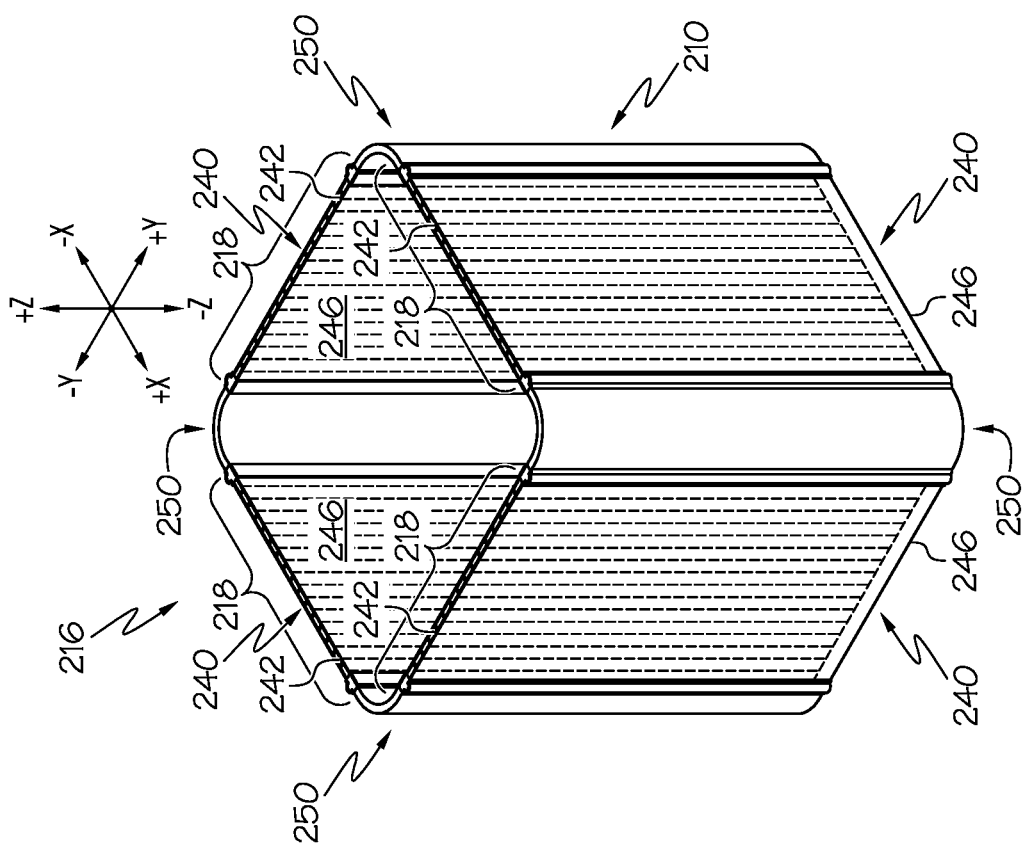
FIG. 3A schematically depicts a perspective view of one or more sidewalls of any extraction housing, according to one or more embodiments shown and described herein.

FIGS. 3A and 3B schematically depict an embodiment of the one or more sidewalls 216 of the extraction housing 210 in isolation from the top wall. In embodiments, the one or more sidewalls 216 may be formed via a plurality of wall panels 240 coupled to one another via a plurality of corners 250. For example, the plurality of wall panels 240 may be flat substrates that are connected via the plurality of corners 250. The plurality of corners 250 may be curved as illustrated, however, more angular corners are contemplated and possible. In some embodiments, the shape of the wall panels 240 and the corners 250 may substantially correspond to the shape of the build module 104.

As shown in FIGS. 3A-3D, each of the wall panels 240 may define a plurality of sidewall fluid flow channels 218 extending therethrough. For example, each wall panel may include 2 more flow channels, 3 or more flow channels, 4 or more flow channels, etc. It is noted that while each sidewall fluid flow channel 218 is depicted as having a substantially rectangular cross-section, other cross-sectional shapes are contemplated and possible (e.g., round, oval, triangular, etc.). The plurality of sidewall fluid flow channels 218 may extend from a top end 242 of the wall panel 240 to the fluid inlet 220 formed within an inner surface 244 of the wall panel 240 to a position adjacent but spaced from a bottom end 246 of the wall panel 240, as illustrated in FIG. 3C. For example, the inner surface 244 of the wall panel 240 may be notched at a position adjacent and spaced from the bottom end 246 of the wall panel 240. The notch 247 may define a directing surface 248 that directs the one or more fluid streams and entrained powder into the plurality of sidewall fluid flow channels 218. In some embodiments, such as where fluid is instead directed into the turbulence chamber through the one or more sidewall fluid flow channels 218, the directing surface 248 may angle the incoming fluid streams toward the powder within the build module 104, as described herein, to provide improved impingement of the powder.

As shown in FIG. 3C, as the bottom end 246 of each wall panel 240 may include a lip 249. The lip 249 may engage the module sidewall 106 to maintain a position of the extraction housing 210 relative with respect to the build module 104 throughout powder extraction.

Referring now to FIG. 3D, in embodiments, the plurality of wall panels 240 may snap together with the plurality of corners 250 to couple the plurality of wall panels 240 with the plurality of corners 250. For example, the each wall panel 240 may comprise a projection 260 or bead which extends from an outer surface 245 (and/or the inner surface 244) of each wall panel 240 along each vertical edge 261. It is contemplated that the projection 260 may extend along an entire vertical length of the wall panel 240, or only a portion thereof. Each corner 250 may define an interlock cuff 252 at each end to engage a wall panel 240. The interlock cuff 252 may receive the edge 261 of the wall panel 240 and extend over the projection 260. The interlock cuff 252 may define a recess 254 configured to receive the projection 260 to secure the wall panel 240 to the corner 250 with the interlock cuff 252. The engagement between the interlock cuff 252 and edge 261 of the wall panel 240 may create a substantially fluid-tight seal, which may aid in maintaining an inert environment once assembled.

Figure 4B:
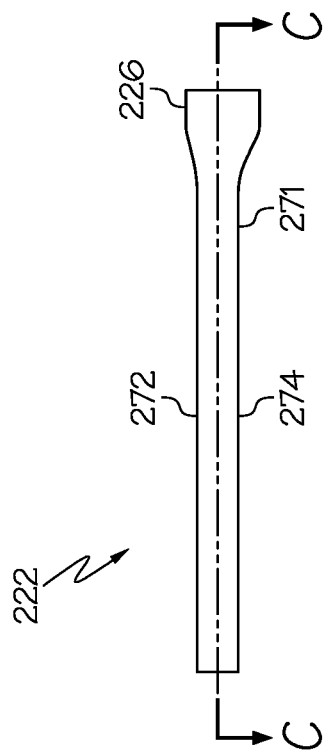
FIG. 4B schematically depicts a side view of top wall of FIG. 4A, according to one or more embodiments shown and described herein.
Figure 4A:
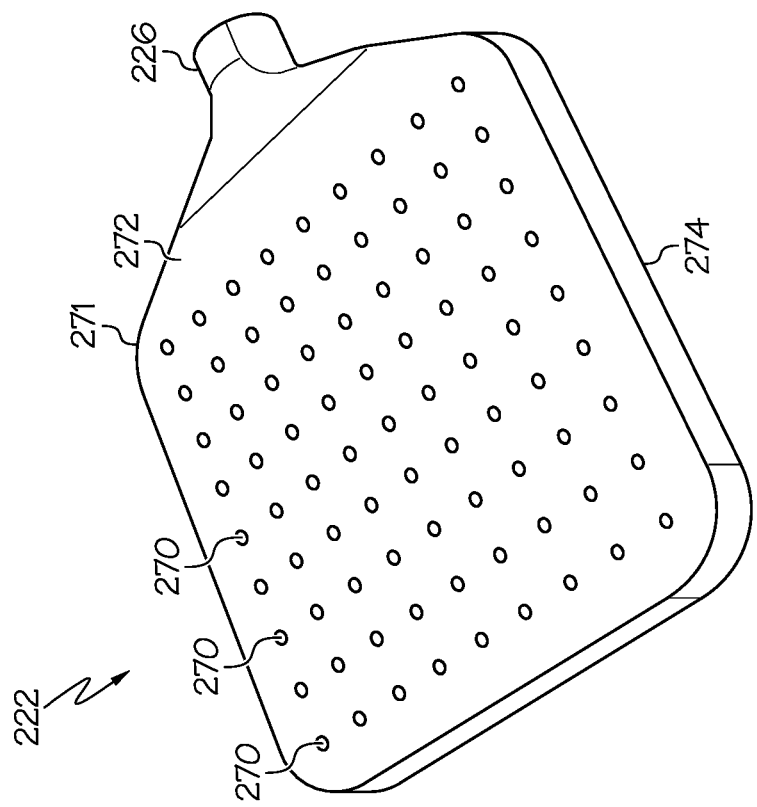
FIG. 4A schematically depicts a perspective view of a top wall of an extraction housing, according to one or more embodiments shown and described herein.

Referring now to FIG. 4A, a schematic isometric view of a top wall 222, such as may be used in the embodiment depicted in FIGS. 2A-2D, is depicted. As illustrated, the top wall 222 may comprise a plurality of through holes 270 which extend from a first planar surface 272 to a second planar surface 274 opposite the first planar surface 272. The plurality of holes 270 are sized and shaped to receive the plurality of tubes 230 as described above. In some embodiments, a bearing material (not shown) may line and/or be positioned within each hole 270 to facilitate the sliding motion of the plurality of tubes 230 (not shown in FIG. 4A). In yet further embodiments, air bearing channels may be formed in each tube hole wall to reduce friction and facilitate sliding. FIG. 4B depicts a side view of the top wall 222. In the depicted embodiment, a vacuum port 226 may be positioned along an edge 271 of the top wall 222. While only one vacuum port 226 is depicted, additional vacuum ports may be included without departing from the scope of the present disclosure.

Figure 4D:
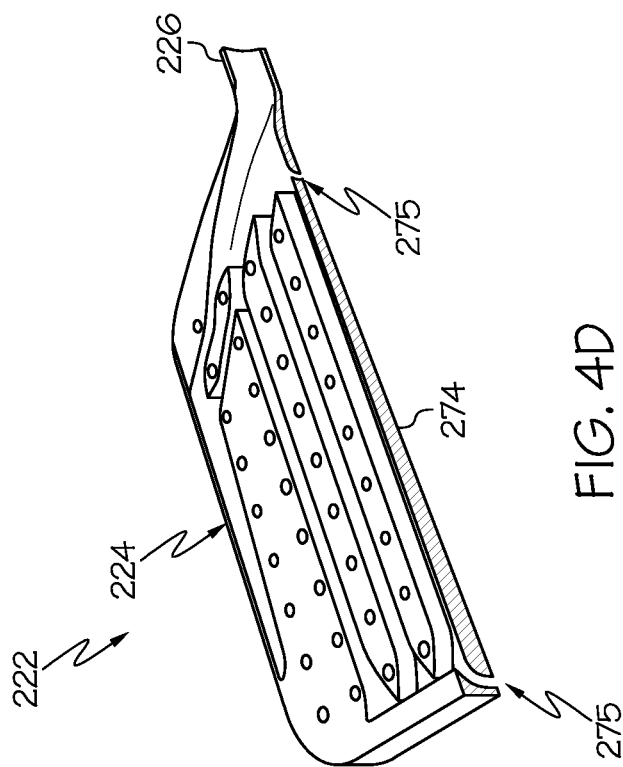
FIG. 4D schematically depicts a cross-sectional view of the top wall of FIG. 4C taken along line B-B depicted in FIG. 4C, according to one or more embodiments shown and described herein.
Figure 4C:
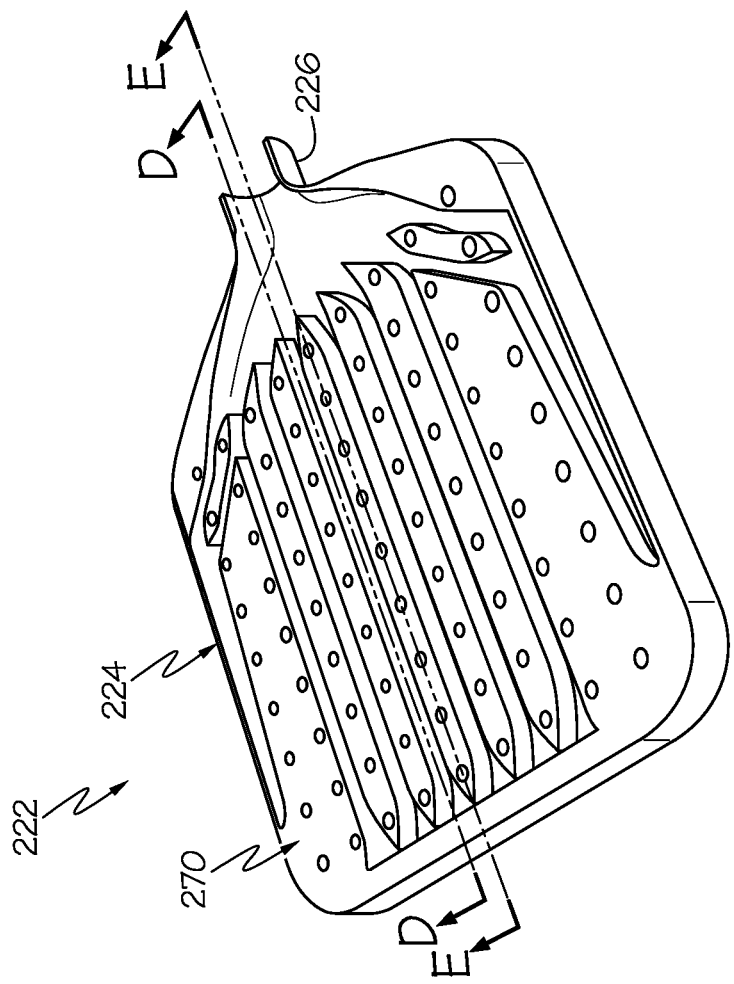
FIG. 4C schematically depicts a cross-sectional view of the top wall taken along line A-A depicted in FIG. 4B, according to one or more embodiments shown and described herein.

FIG. 4C depicts a cross-section of the top wall 222 taken along line C-C of FIG. 4B. Within the interior of the top wall 222 may be the plurality of top wall fluid flow channels 224. The plurality of top wall fluid flow channels 224 may converge with one another to toward the vacuum port 226. Accordingly, the top wall fluid flow channels 224 may also be referred to a plurality of converging flow channels. As noted herein, the top wall fluid flow channels 224 may be coupled to the sidewall fluid flow channels 218 described above, such that the sidewall fluid flow channels 218 are in fluidic communication with the top wall fluid flow channels 224. Accordingly, the top wall 222 may act as a vacuum outtake manifold to combine flows from each of the sidewall fluid flow channels 218 into a single stream which may exit the top wall vacuum port 226. The plurality of top wall fluid flow channels 224 may be dimensioned to maintain the velocity of the fluid streams constant.

FIG. 4D illustrates a cross-section of the top wall 222 taken along line D-D of FIG. 4C. From this perspective, one or more sidewall ports 275 formed in the second planar surface 274 are depicted. The one or more sidewall ports 275 may engage the one or more sidewalls 216 as described herein, to fluidically couple the plurality of sidewall fluid flow channels 218 with the plurality of top wall fluid flow channels 224.

Referring now to FIG. 4E, a cross-section of the top wall 222 taken along line E-E of FIG. 4C is depicted. FIG. 4E depicts the plurality of through holes 270 extending through the top wall 222 at a position between adjacent top wall fluid flow channels 224 of the plurality of top wall fluid flow channels 224. Accordingly, the plurality of tubes 230 may extend through the top wall 222 at a position between the adjacent top wall fluid flow channels 224 to prevent the plurality of tubes 230 from blocking fluid flowing through the plurality of top wall fluid flow channels 224 or otherwise impeding the flow path defined through the plurality of top wall fluid flow channels 224.

In some embodiments, the top wall 222 may be formed via thin-walled structures such that the top wall is substantially hollow, which may reduce waste and material costs. In some embodiments, instead of a plurality of top wall fluid flow channels 224, there may only be a single hollow chamber and each of the plurality of tubes 230 may extend through the single hollow chamber.

Figure 5B:
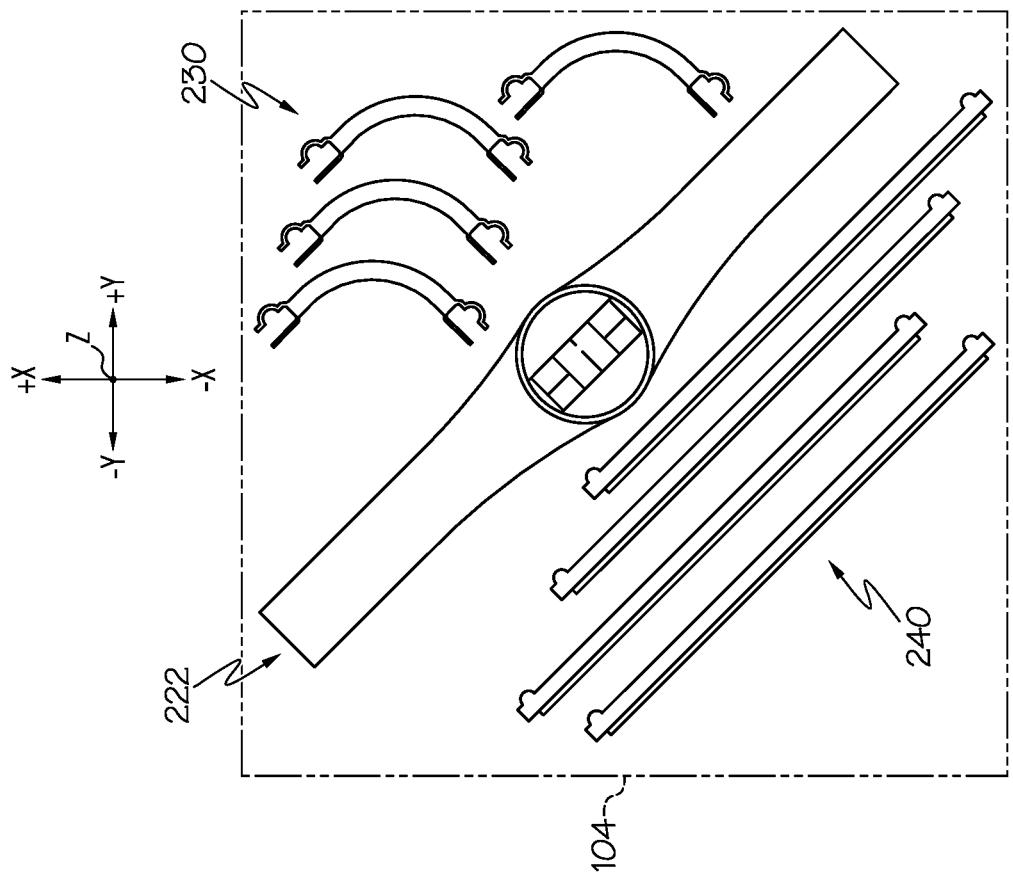
FIG. 5B schematically depicts a top view of the build module of FIG. 5A, according to one or more embodiments shown and described herein.
Figure 5A:
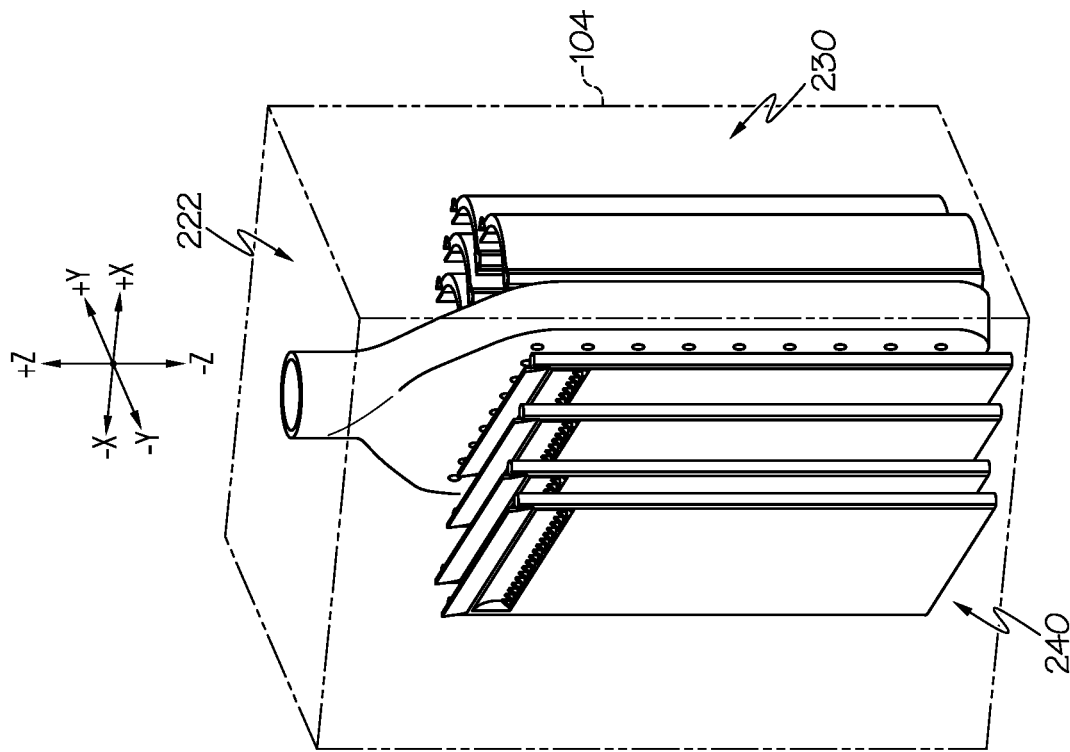
FIG. 5A schematically depicts an additive manufacturing build module for additively manufacturing a one or more components of an extraction housing, according to one or more embodiments shown and described herein.

The various components including the wall panels 240, corners 250, top wall 222, and/or the plurality of tubes 230, may be manufactured via any conventional manufacturing technique. However, in some embodiments, the various components may be manufactured via additive manufacturing. For example, the wall panels 240, corners 250, top wall 222, and/or plurality of tubes 230 may be formed via binder jet, DMLM, SLM, etc. In embodiments, it is contemplated that the wall panels 240, corners 250, and top wall 222 may be manufactured simultaneously within the same build module 104, schematically depicted in FIGS. 5A and 5B, with a build direction along the +Z direction of the depicted coordinate axes. By forming the wall panels 240 and corners 250 as separate pieces, each of the wall panels 240, the corners 250, and the top wall 222 may be arranged within the volume of the build module 104 to allow for simultaneous manufacturing. Potential materials may include, but are not limited to stainless steel, cobalt chrome, maraging steel, aluminum, nickel alloy, titanium, plastic, or any combination thereof.

Additional alternative embodiments will now be described. Each of the provided embodiments provide additional variations to the above embodiments. Accordingly, the below embodiments may have substantial similar components to those described above except as otherwise noted.

Figure 6:
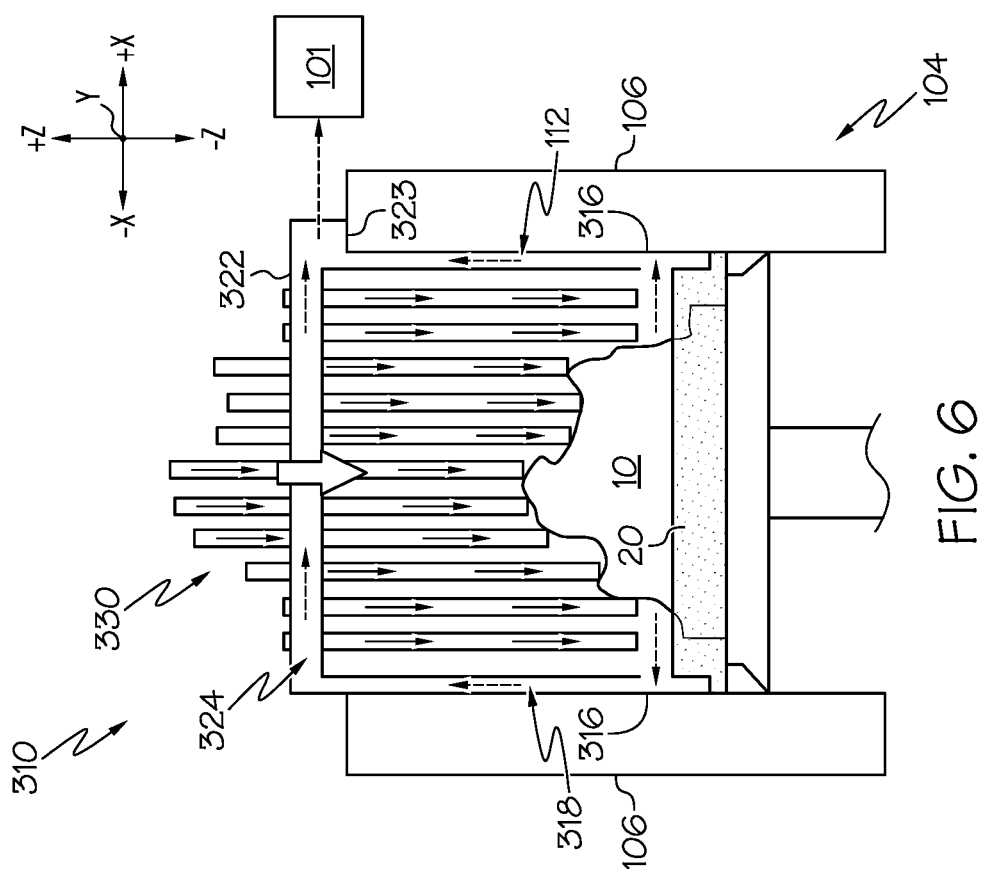
FIG. 6 schematically depicts another embodiment of an extraction housing, according to one or more embodiments shown and described herein.

Referring now to FIG. 6, similar to the above-referenced embodiments, an extraction housing 310 may similarly include one or more sidewalls 316, which may define one or more sidewall fluid flow channels 318, a top wall 322 which defines one or more top wall fluid flow channels 324, and a plurality of tubes 330 slidably engaged with the top wall 322. In the indicated embodiments, the one or more sidewalls 316 are dimensioned to fit laterally within the module sidewalls 106 of the build module 104. During operation, the top wall fluid flow channels 324 may be fluidically coupled to the vacuum pump 101 to draw fluid and powder from the turbulence chamber 112 into the sidewall fluid flow channels 318 which directs fluid into the top wall fluid flow channels 324 and out of the extraction housing 310.

Similar to the above embodiments, suction from the vacuum pump 101 may cause fluid to flow through the plurality of tubes 330 and impinge the loose powder 20 within the build module 104 thereby creating turbulence and entraining the loose powder 20 within the one or more fluid streams, which are then extracted through the extraction housing 310. As the loose powder 20 is removed, the extraction housing 310 may move into the build module 104, thereby decreasing the volume of the turbulence chamber 112. As the printed object 10 is contacted by the plurality of tubes 330, the tubes 330 may slide as needed through the top wall 322 to accommodate the contours of the printed object 10. The top wall 322 may be dimensioned to provide a stop 323 to limit the distance the extraction housing 310 may travel into the build module 104. In other embodiments, the length of the one or more sidewalls 316 may limit the distance the extraction housing 310 extends into the build module 104 via contact with the moveable build plate 108. Accordingly, in this embodiment, the moveable build plate 108 may remain stationary during powder extraction.

Figure 7:
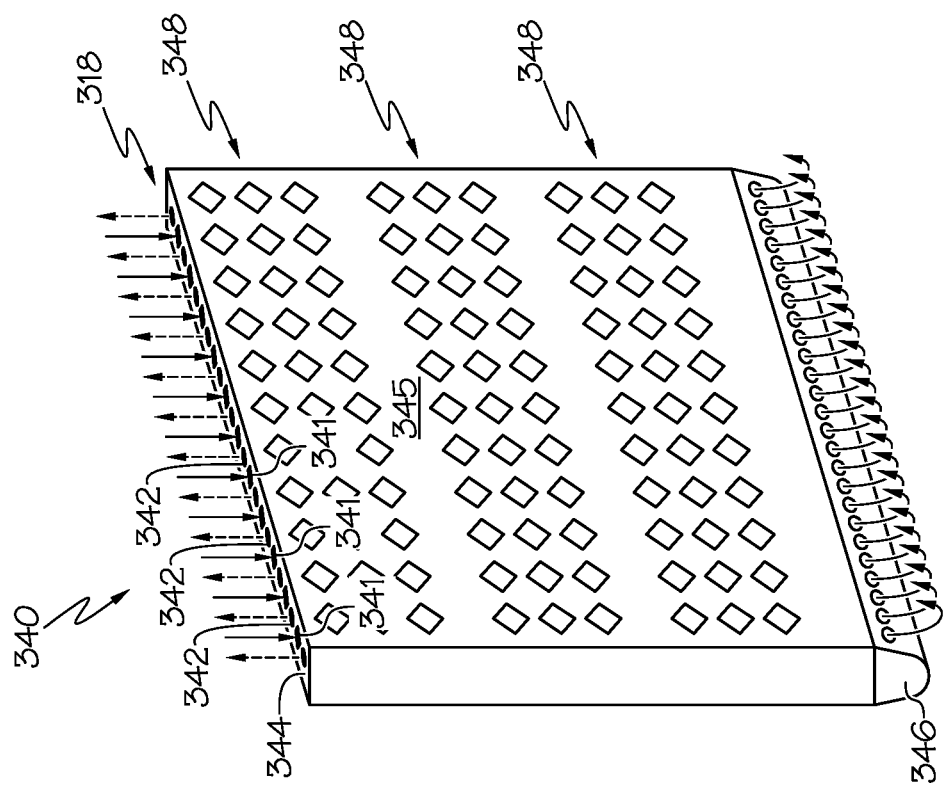
FIG. 7 schematically depicts an embodiment of a sidewall of an extraction housing, according to one or more embodiments shown and described herein.

Referring now to FIG. 7, an alternative embodiment of a wall panel 340 is schematically depicted, which may be useful in one or more embodiments described herein, but particularly in the embodiment depicted in FIG. 6. In the embodiment, the one or more sidewall fluid flow channels 318 may include a plurality of fluid inlet channels 341 and a plurality of fluid outlet channels 342.

The plurality of fluid inlet channels 341 may allow for one or more fluid streams to enter the turbulence chamber 112 (not shown in FIG. 7) to aid in entraining loose powder 20 into one or more fluid streams. The plurality of fluid inlet channels 341 extend from a top end 344 of the wall panel 340 to a position adjacent a bottom end 346 of the wall panel 340 and arranged to direct fluid toward the powder 20 within the build module 104.

The plurality of fluid outlet channels 342 may be interspersed among the plurality of fluid inlet channels 341. However, the plurality of fluid outlet channels 342 may be fluidically coupled to the vacuum pump 101 (not shown in FIG. 7) to aid in vacuuming loose powder 20 from the turbulence chamber 112. The plurality of fluid outlet channels 342 may each define one or more, or a plurality of, interior vacuum ports 348 formed on an interior surface 345 of the wall panel 340. In embodiments, each fluid outlet channel 342 may define a plurality of interior vacuum ports 348 to provide multiple points of entry into the fluid outlet channel 342, enabling powder entrained fluid streams to enter the fluid outlet channels 342 at multiple levels.

Referring now to FIG. 8, a similar embodiment of an extraction housing 410 is depicted which includes one or more sidewalls 416, a top wall 422, and a plurality of tubes 430 slidably coupled to the top wall 422. However, in this embodiment, the one or more vacuum ports 426 may be coupled to the one or more sidewalls 416 of the extraction housing. Each vacuum port 426 may be coupled to a vacuum pump 101. The vacuum ports 426 may be coupled to the same vacuum pump 101, or multiple vacuum pumps 101 can be included such that each vacuum port 426 is coupled to a different vacuum pump 101 than one or more other vacuum ports 426. Where the one or more vacuum ports 426 are located at or near bottom end 446 of the one or more sidewalls 416 as depicted, the one or more sidewalls 416 need not define one or more sidewall fluid flow channels extending toward the top wall 422. Additionally, the top wall 422 need not define top wall fluid flow channels, as provided in the above-described embodiments. For example, in the embodiment of FIG. 8, once the vacuum pump 101 is active, the vacuum pressure may cause fluid streams to enter the plurality of tubes 430 and impinge the powder, cause turbulence, and entrain the powder within one or more fluid streams. The powder may then be removed through the sidewalls at the one or more vacuum ports 426. However, it is contemplated that, in some embodiments the one or more sidewalls 416 and/or the top wall 422 may still define on or more fluid flow channels, and which may provide for suction and/or blowing of one or more fluid streams. For example, there may be multiple heights providing for suction and/or blowing formed within the one or more sidewalls 416.

Figure 9B:
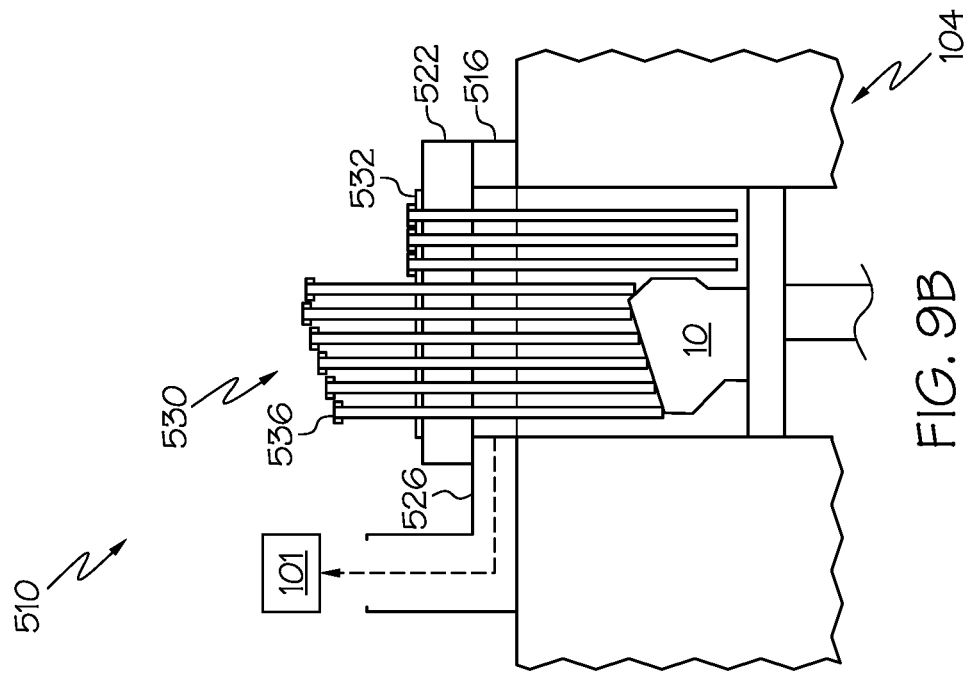
FIG. 9B schematically depicts the extraction housing of FIG. 9A, extracting powder from a build module, according to one or more embodiments shown and described herein.
Figure 9A:
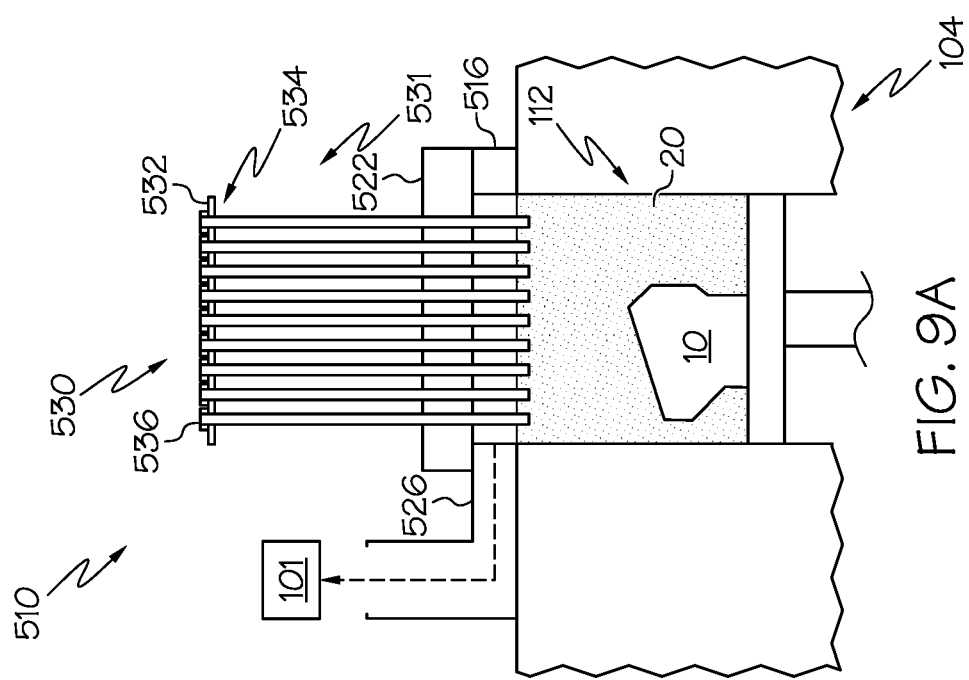
FIG. 9A schematically depicts yet another yet another embodiments of an extraction housing pre-powder extraction, according to one or more embodiments shown and described herein.

FIGS. 9A and 9B depict yet another embodiment of a extraction housing 510. In this embodiment, the extraction housing may include a top wall 522, one or more sidewalls 516, and a plurality of sliding tubes 530. However, in this embodiment, the one or more sidewalls 516 may be substantially shorter than in previously embodiments and may or may not provide for fluid flow channels. Similarly the top wall 522 may or may not define fluid flow channels. As shown in FIGS. 9A and 9B, the one or more vacuum ports 526 may be attached to the one or more sidewalls 516 and the plurality of tubes 530 may slidably extend through the top wall 522. In the present embodiment, the plurality of tubes 530 start at a raised position 531, as illustrated in FIG. 9A above the top wall 522. To maintain alignment of the plurality of tubes 530 when in the raised position 531, a plate 532 may be coupled to each of the plurality of tubes 530, thereby coupling each of the plurality of tubes 530 to one another. When in the raised position 531, the plate may be mounted to the tubes at an upper end 534 of the plurality of tubes 530. During powder extraction, the vacuum pump 101 may draw fluid from the turbulence chamber 112, which causes fluid to flow in through the plurality of tubes and impinge the loose powder 20, thereby creating turbulence and entraining the loose powder 20 with one or more fluid streams which may then be removed via the vacuum port 526. As loose powder 20 is removed, the plurality of tubes 530 may move into the build module 104 and turbulence chamber 112, as illustrated in FIG. 9B under their own weight. Once a tube of the plurality of tubes 530 contacts the printed object 10, the tube may detach from the plate 532 to allow the uncontacted tubes and the plate 532 to continue moving in a downward direction until all or substantially all of the powder 20 is removed. For example, the plurality of tubes 530 may each engage the plate 532 with an interference fit, which maintains the plate 532 at the upper end 534 of the tube. The interference fit may be overcome once a tube which contacts the printed object 10 can no longer move downward with the other tubes.

In embodiments, a retaining structure 536 (e.g., a nut, mass, etc.) may be coupled to the upper end 534 of each tube. The retaining structure 536 may ensure the plate 532 does disengage from the plurality of tubes 530 via the upper end 534 of the plurality of tubes 530. In some embodiments, there may not be a friction fit between the plate 532 and the tubes 530. For example, the plate may only be used to hold the tubes 530 in an upper position during installation of the extraction housing 510. Once installed over the build module 104, the plate 532 may slide down while the tubes 534 remain in an extended position. The tubes 534 may slide as powder is removed, as with embodiments described above.

It is noted that in any of the above described embodiments, the tubes may be fluidically coupled to a vacuum pump 101 and used for suction as opposed to blowing. Moreover, in embodiments the plurality of tubes may include laterally extending tubes which may slidably extend through a sidewall of the extraction housing.

Referring now to FIGS. 10A-10C, in some embodiments, instead of the tubes sliding relative through the top wall, the tubes may be telescoping tubes. For example, FIGS. 10A-10C depict a telescoping tube 630. The telescoping tube 630 may comprise a base housing 632 from which nested telescoping portions 634 extend, shown partially extended in FIG. 10B and fully extended in FIG. 10C. Accordingly, during use, as powder is removed from the turbulence chamber 112 (not shown in FIGS. 10A-10C), the telescoping tube 630 may telescope from a retracted configuration (FIG. 10A) to an extended configuration depicted in FIGS. 10B and 10C.

In some embodiments, the nested telescoping portions 634 may be perforated, as illustrated in FIG. 10C, or solid. A perforated tube may provide for improved radial blowing from the tube as well as blowing through an end of the tube. In some embodiments, a single tube may perform both blowing and suction. For example, the tube may define multiple flow channels therein where one flow path provides for blowing, while the other flow path provides for suction via fluidic communication with a vacuum pump 101. It is noted that in various embodiments, the plurality of tubes, whether slide or telescoping may be formed via additive manufacturing (e.g., binder jet, DMLM, SLM, etc.).

Figure 11:
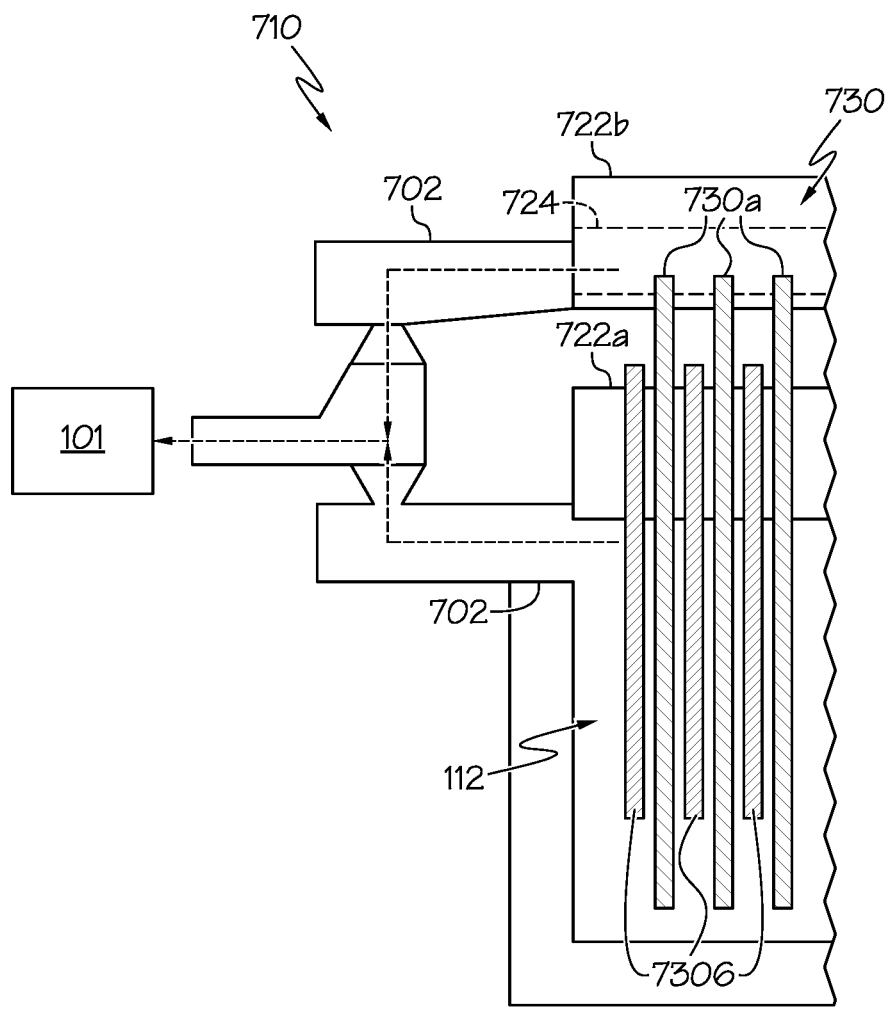
FIG. 11 schematically depicts another embodiments of an extraction housing, according to one or more embodiments shown and described herein.
Figure 12D:
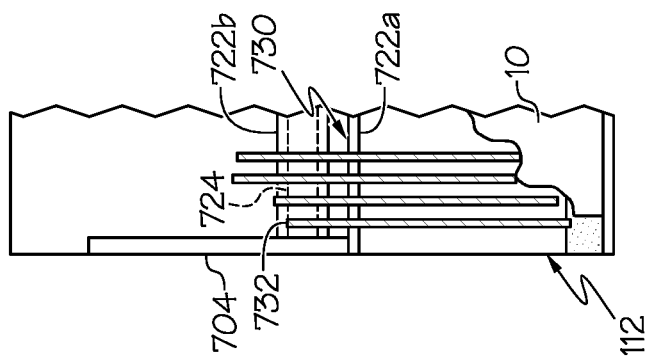
FIG. 12D schematically depicts all of the extraction tubes exiting the vacuum application zone during extraction of powder from the build module of FIG. 12C, according to one or more embodiments shown and described herein.
Figure 12C:
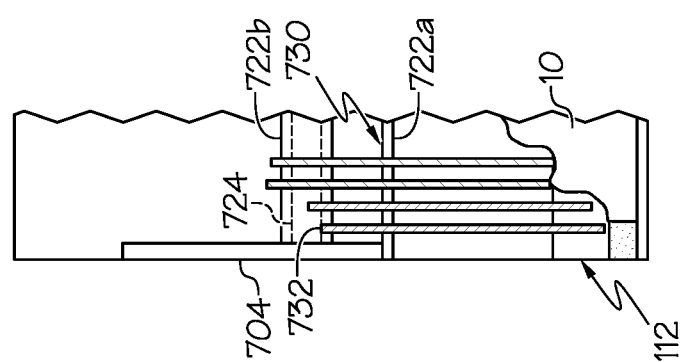
FIG. 12C schematically depicts a portion of the extraction tubes exiting a vacuum application zone during extraction of powder from the build module of FIG. 12A, according to one or more embodiments shown and described herein.
Figure 12B:
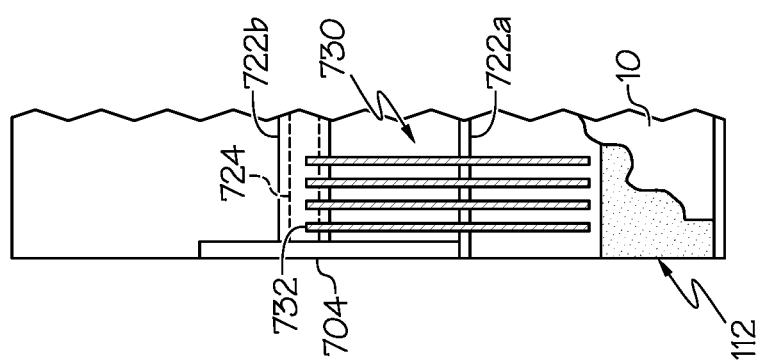
FIG. 12B schematically depicts the extraction housing extracting powder from the build module of FIG. 12A, according to one or more embodiments shown and described herein.
Figure 12A:
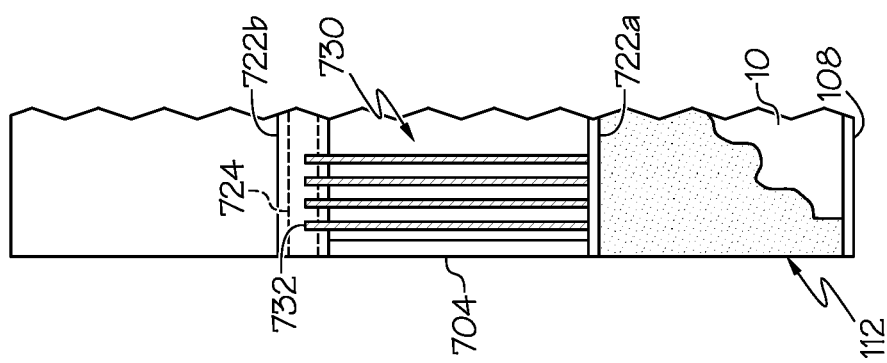
FIG. 12A schematically depicts another embodiment of an extraction housing including a plurality of extraction tubes for removing powder from a build module, according to one or more embodiments shown and described herein.

FIG. 11 schematically depicts yet another embodiment of an extraction housing 710. In FIG. 11, the extraction housing 710 may comprise a first top wall 722a and a second top wall 722b positioned above and parallel to the first top wall 722a, and a plurality of tubes 730 such as described herein. A first portion 730a of the plurality of tubes 730 may extend through the first top wall 722a and be able to slide therethrough. The first portion 730a of the plurality of tubes 730 may be fluidically coupled to one or more fluid flow channels 724 formed within the second top wall 722b. As depicted, the one or fluid flow channels 724 of the second top wall 722b may be fluidically coupled to the vacuum pump 101. Accordingly, the first portion 730a of the plurality of tubes 730 may be configured to deliver suction within the turbulence chamber 112. A second portion 730b of the plurality of tubes 730 may be interspersed among the first portion 730a but may not extend into or through the second top wall 722b, may remain spaced therefrom, or instead may be slid through openings in the second top wall 722*b* without becoming fluidically coupled to the one or more fluid flow channels 724 formed within the second top wall 722*b*. When activated, the vacuum pump 101 may suction fluid and/or powder through the first portion 730*a* of the plurality of tubes 730 and the second portion 730*b* may, via the suction of the vacuum pump 101, provide a plurality of fluid inlets to deliver fluid into the turbulence chamber 112, impinge the powder, and entrain the powder into one or more fluid streams to be suctioned out via the first portion 730*a* of the plurality of tubes 730. During powder removal, the second top wall 722*b* may move relative to the first top wall 722*a* as powder is removed to allow the first portion 730*a* of the plurality of tubes 730 to extend further into the turbulence chamber 112.

Still referring to FIG. 11, in some embodiments, the vacuum pump 101 may be plumbed to the turbulence chamber via a vacuum port 702 formed within a sidewall of extraction housing 710. However, in some embodiments, there may be no sidewall, and the vacuum port may be coupled to the first top wall 722*a* and/or the second top wall 722*b*. That is, in some embodiments, both the first top wall 722*a* and the second top wall 722*b* may be fluidically coupled to the vacuum pump 101 via the same or separate vacuum ports 702. For example, the vacuum port 702 may comprise a manifold to fluidically couple both the first top wall 722*a* and the second top wall 722*b* to the vacuum pump 101.

In some embodiments, it is contemplated that there may not be a second portion 730*b* of the plurality of tubes 730. In such embodiments, there may be holes formed within the first top wall 722*a* which may be used for the inflow of fluid. In yet further embodiments, instead of being fluidically coupled to one or more fluid flow channels 724 formed within the second top wall 722*b*, each of the first portion 730*a* of the plurality of tubes 730 may be individually plumbed to one or more vacuum pumps 101.

FIGS. 12A-12D illustrate a similar embodiment to that described above with respect to FIG. 11. In this embodiment, one or more slides 704 connect the first top wall 722*a* to the second top wall 722*b* and allow the second top wall 722*b* to remain in alignment with the first top wall 722*a* as it slides toward the first top wall 722*a* during powder extraction. In this embodiment, as in the above embodiment, the one or more fluid flow channels 724 of the second top wall may be fluidically coupled to a vacuum pump 101 (not shown in this these figures). An upper end 732 of each tube of the plurality of tubes 730 is positioned within the one or more fluid flow channels 724 of the second top wall 722*b*, initially as depicted in FIG. 12A. However, in this embodiment, as the plurality of tubes 730 suction out powder and contact the printed object 10 (as illustrated in FIGS. 12B-12D), the tubes 730 may slide relative to the second top wall 722*b* to exit the one or more fluid flow channels 724 of the second top wall 722*b* and cease being fluidically coupled to the vacuum pump 101. For example, the plurality of tubes 730 may pass through a valve (not shown) formed in the second top wall 722*b* to escape the one or more fluid flow channels 724.

It is noted that in the embodiment illustrated in FIGS. 12A-12D, tubes that provide fluid inlet paths (such as depicted in FIG. 11) may also be included, without departing from the scope of the present disclosure, such that the embodiment depicted in FIGS. 12A-12D includes both “blowing” and “suction” tubes.

Referring now to FIGS. 13A and 13B, a top wall 822 is schematically depicted, and may be applicable to various embodiments shown herein. In the present embodiment, the top wall 822 includes a one or more of top wall fluid flow channels 824, which may be fluidically coupled to a vacuum pump 101 (not shown), one or more through holes 870 may receive at least a portion of a plurality of tubes 830 (depicted in FIG. 13B), a portion of (e.g., 830*a*) which may be coupled to and/or extend through the plurality of through holes 870. In this embodiment, the top wall 822 may include a first planar surface 872, and a second planar surface 874 opposite the first planar surface 872. As schematically depicted in FIGS. 13A and 13B, at least a portion of the second planar surface 874 may be a perforated plate 877 comprising a plurality of small openings sized to receive powder therein. Accordingly, in such embodiments, vacuum applied through the one or more top wall flow channels may further allow capture of powder through the perforated plate, such as indicated by arrows 888 in FIG. 13B.

In some embodiment, some of the through holes 870 of FIG. 13B may not be coupled to a tube. In such embodiments, in combination with the perforated plate, some of the though holes 870 may provide inlets to create further turbulence within the turbulence chamber. Some of the through holes 870 may be coupled to a first portion of the tubes 830 which extend further, as opposed to through holes 870 without tubes, into the turbulence chamber to deliver fluid flow closer to powder within the turbulence chamber.

As depicted in FIG. 13B, a second portion of the tubes 830*b*, may not extend through the top wall 822, but may be coupled to the perforated plate and fluidically coupled to the one or more top wall fluid flow channels 824. In such embodiments, the second portion of tubes 830*b* may be fluidically coupled to the vacuum pump 101 (not shown), via the vacuum port 826 and the one or more top wall fluid flow channels 824 to capture powder and remove it from the extraction housing 810. In other embodiments, the second plurality of tubes may slide be slidable through the top wall 822 in a manner similar to embodiments described with respect to FIGS. 11 of 12A-12D.

It should be noted that, in some embodiments, such as illustrated with respect to FIG. 13B, the one or more sidewalls 816, may also include one or more perforated plates 823. Similar to the perforated plate 877 of the top wall 822, the one or more perforated plates 823 of the one or more sidewalls 816, provide openings into one or more sidewall fluid flow channels, such as described herein, which may also be fluidically coupled to the vacuum pump 101, to provide additional capture of powder through the one or more sidewalls 816.

Referring now to FIG. 14, another embodiment, similar to that depicted in FIGS. 11-12D, is schematically depicted. In this embodiment, the extraction housing 910 includes a first top wall 922*a* and a second top wall 922*b*, and a plurality of tubes 930. This embodiment differs from previous embodiments in that each tube comprises a tubular housing 932 and a sliding portion 933 which is housed within the tubular housing when retracted and slides from the tubular housing 932 when extended. In this embodiment, the tubular housing 932 may be coupled to the second top wall 922*b* and the first top wall 922*a*, and may maintain the spacing between the first top wall 922*a* and the second top wall 922*b*, Additionally, in this embodiment, the sliding portion 933 may be perforated along its length as illustrated.

In this embodiment, one or more fluid flow channels 924 formed into first top wall 922*a* may be fluidically coupled to the sliding portion 933 of each tube, for example, through the plurality of perforations. The one or more fluid flow channels 924 formed in the first top wall 922*a* may fluidically couple to sliding portions 933 of the plurality of tubes 930 to the vacuum pump 101 to allow the sliding portions 933 of the plurality of tubes 930 to suction powder out of the build module 104, in a manner similar to other embodiments described herein. In some embodiments, the sliding portions 933 may fall under their own weigh into the turbulence chamber 112. However, in some embodiments, an upper end of each sliding portion 933 may be closed (e.g., via a stopper, plug, or the like). In such embodiments, the second top wall 922b may be coupled to a pressure source 105 (e.g., a pump, compressor, or the like) which may be, in turn, fluidically coupled to the tubular housings 932 of the plurality of tubes 930. In such embodiments, the pressure source 105 may be operated to push the sliding portions 933 down through the tubular housings 932, which may increase the rates of powder removal.

Figure 15B:
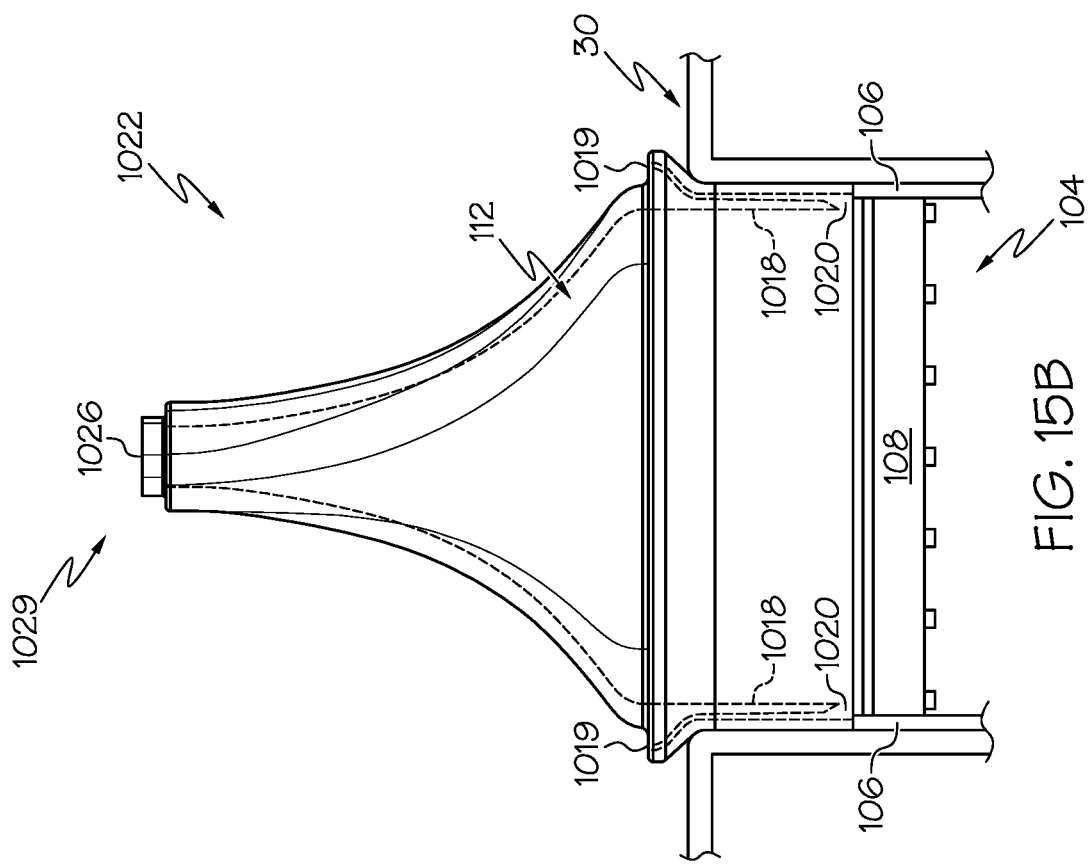
FIG. 15B schematically depicts the extraction housing of FIG. 15A arranged over a build platform, according to one or more embodiments shown and described herein.
Figure 15A:
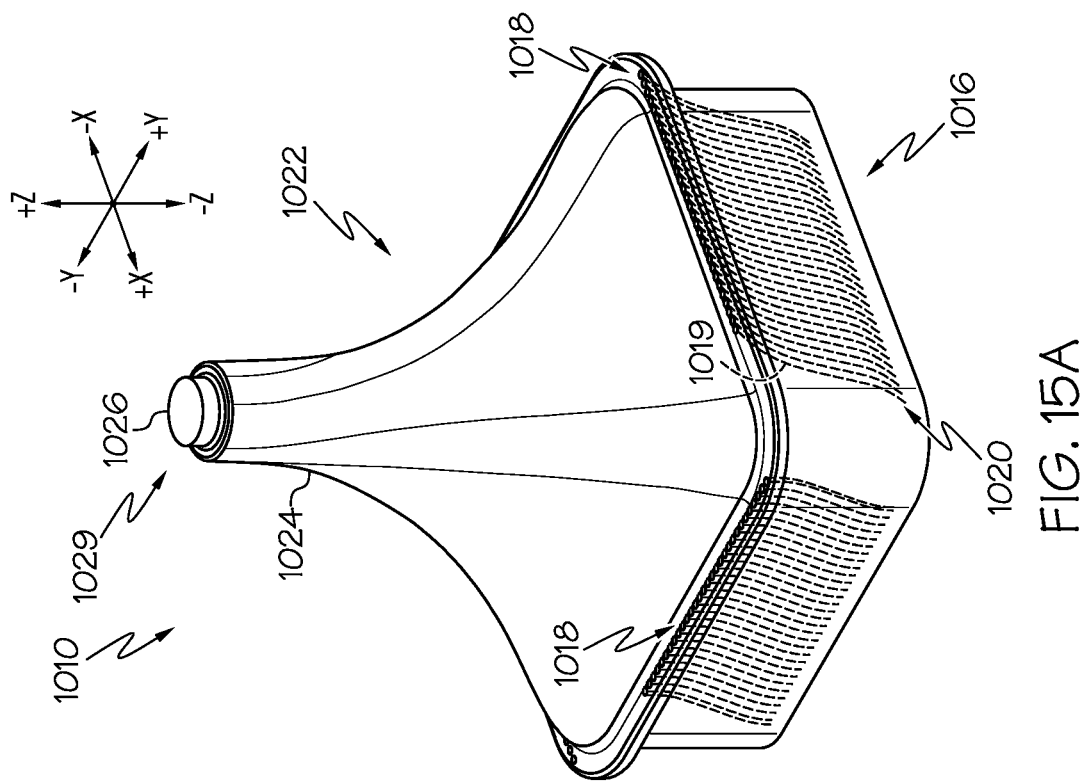
FIG. 15A schematically depicts yet another embodiment of an extraction housing, according to one or more embodiments shown and described herein.

Referring now to FIG. 15A, yet another embodiment of an extraction housing 1010 is depicted. In this embodiment, the extraction housing 1010, similar to the above described embodiments, may include a top wall 1022 and one or more sidewalls 1016. In this embodiment, the top wall 1022 and the one or more sidewalls 1016 may be integrally formed with one another, such as through additive manufacturing, molding, or the like. The extraction housing 1010 may engage with a build module 104 in a manner similar to the above-described embodiments. For example, the sidewalls 1016 may be inserted into a build module receiving housing 30 of an additive manufacturing machine, and sit upon the sidewalls 106 of the build module 104. The sidewalls 1016 may seal to the sidewalls 106 of the build module 104 along a perimeter of the build module 104. The sidewalls, accordingly, may be shaped to correspond to a shape and size of the build module 104. In the indicated embodiment, the sidewalls 1016 provide a square or rectangular cross-section, though other cross-sections are contemplated and possible, and the top wall 1022 transitions from the sidewall cross-section to a round cross-section of the top of the top wall 1022.

Figure 13A:
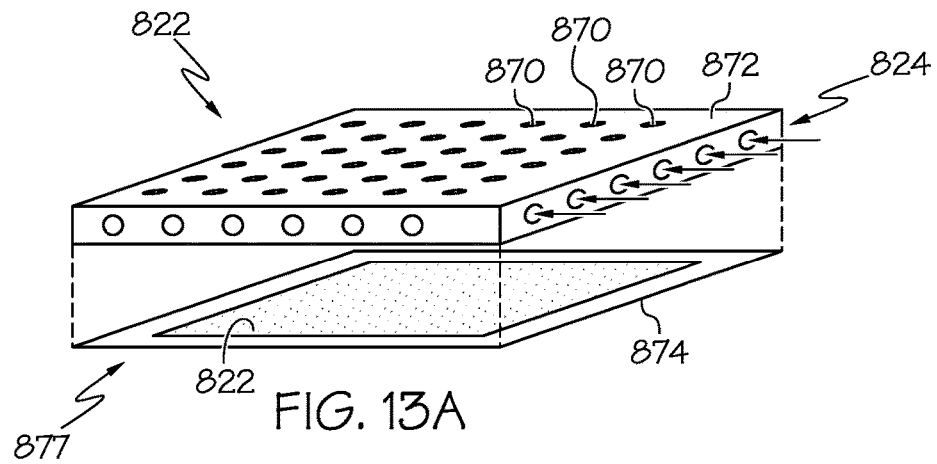
FIG. 13A schematically depicts a top wall of an extraction housing, according to one or more embodiments shown and described herein.
Figure 13B:
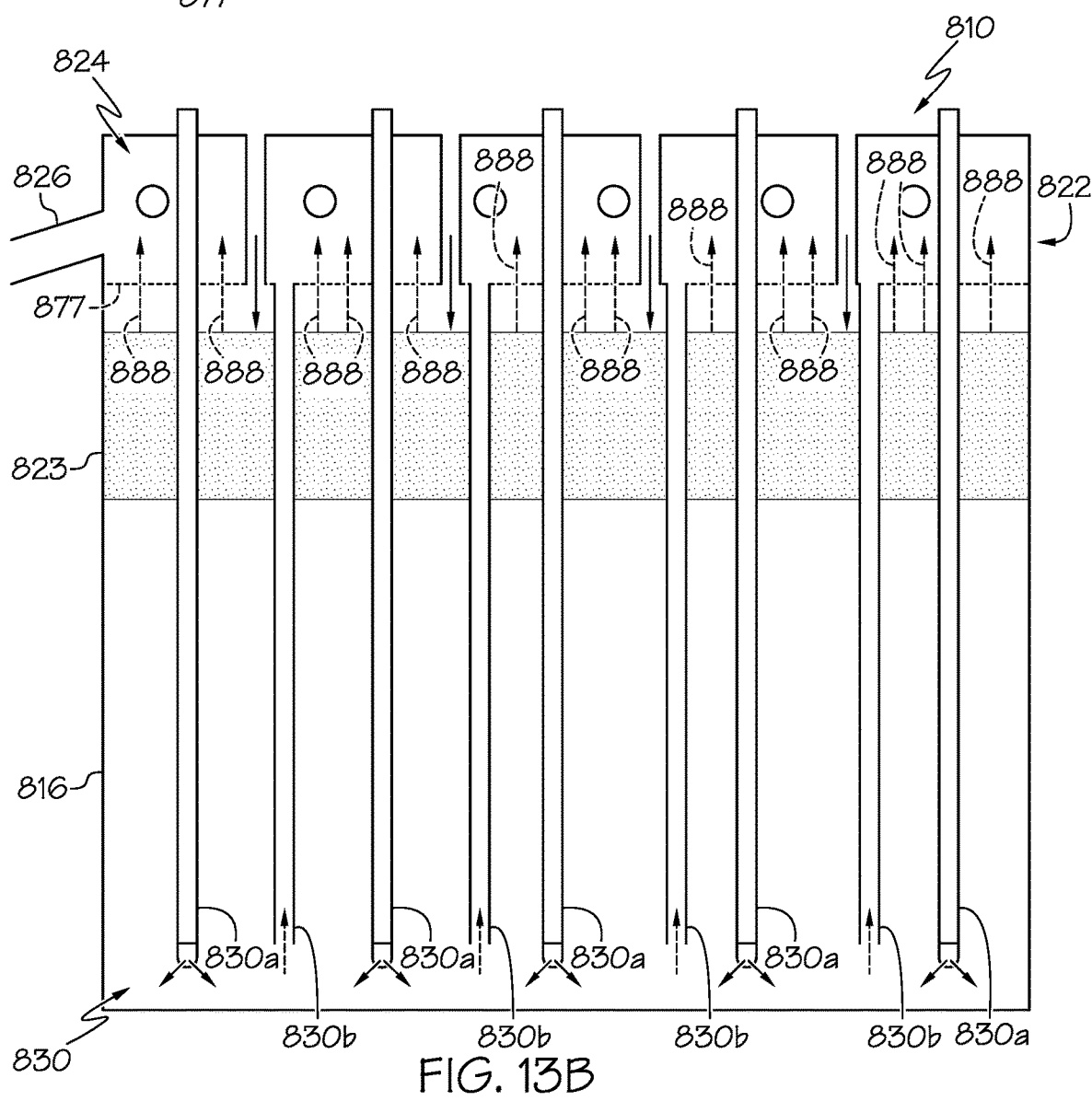
FIG. 13B schematically depicts a schematic view of flow channels formed in a sidewall of the extraction housing of FIG. 13A, according to one or more embodiments shown and described herein.
Figure 14:
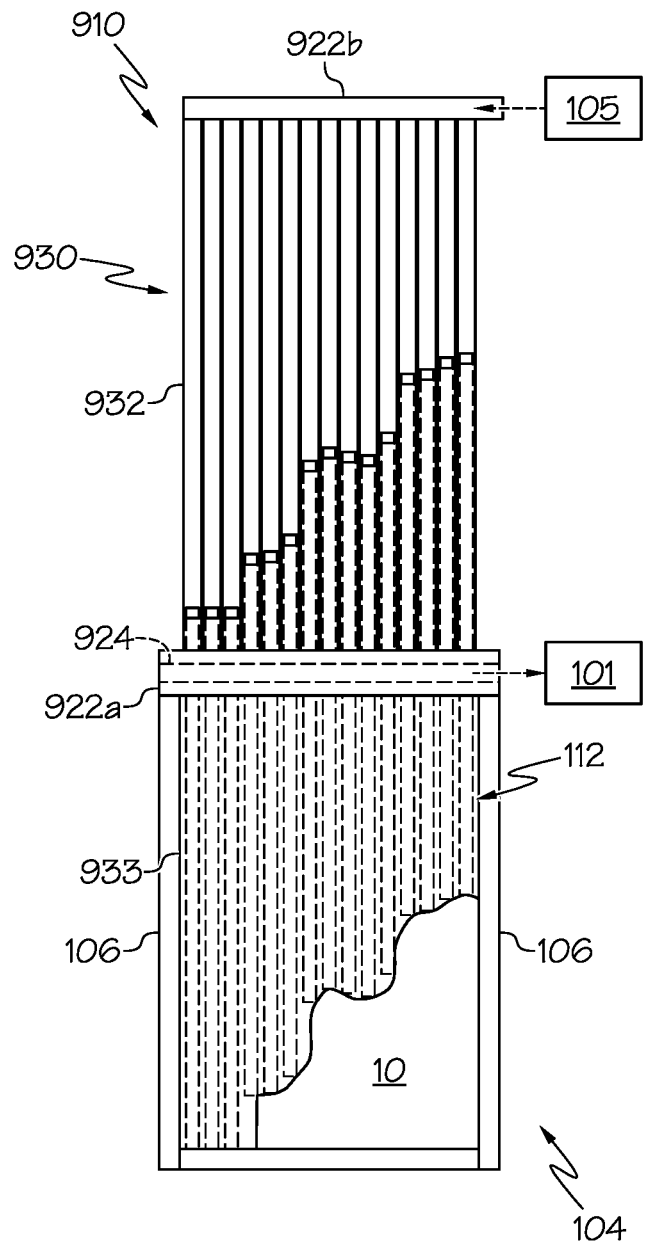
FIG. 14 schematically depicts yet another embodiment of an extraction housing, according to one or more embodiments shown and described herein.

In this embodiment, the top wall 1022 is elongated in the +Z direction of the depicted coordinate axes and provided with a funnel-like shape, which may have a swirl pattern 1024 in either a clockwise (as depicted) or counterclockwise direction. A vacuum port 1026 may extend from a top end 1029 of the top wall 1022, and may be fluidically coupled to a vacuum pump 101 (not shown). A slope from a base of the top wall 1022 to the top of the top wall 1022 may be designed to achieve a desired flow rate and/or amount of turbulence with the turbulence chamber (indicated in FIG. 13B). For example, the slope of the top wall 1022 may be between about 0 degrees and about 90 degrees, such as about 45 degrees. For example, the slope of the top wall 1022 may be gradual to avoid loss of momentum within the turbulence chamber 112 during powder extraction thereby maintaining turbulence within the turbulence chamber 112.

The one or more sidewalls 1016 are coupled to the top wall 1022. The one or more sidewalls 1016 may define a plurality of sidewall fluid flow channels 1018 extending therethrough. For example, the plurality of fluid flow channels may have an outer inlet 1019 formed at the top of the one or more sidewalls 1016 and positioned around a perimeter of the top wall 1022 and an inner inlet 1020 formed on the one or more sidewalls 1016 within the turbulence chamber 112 for directing fluid flow into the turbulence chamber 112. For example, the plurality of sidewall fluid flow channels 1018 may be curved and/or angled (e.g., s-shaped) to provide an angle of impingement (e.g. between about 0° to about 90° relative to the vertical axis, such as about 45° in one or more both of the YZ and the XZ planes of the depicted coordinate axes) and swirl the fluid being drawn through the plurality of sidewall fluid flow channels 1018, such that air being pulling into the turbulence chamber 112 between the extraction housing 1010 and the build module 104 is swirled upon entry.

Figure 15D:
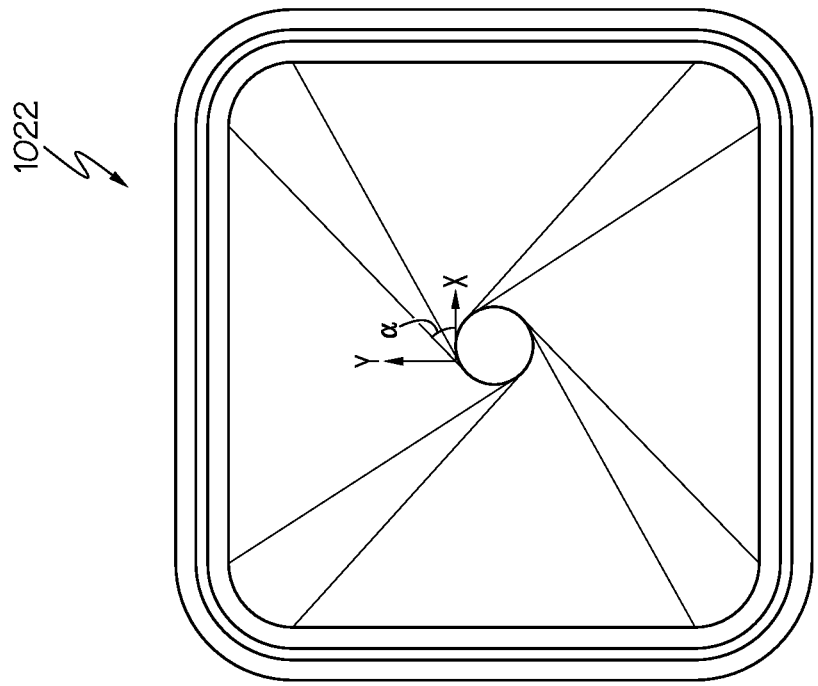
FIG. 15D schematically depicts a top wall swirl pattern of the extraction housing of FIG. 15A, according to one or more embodiments shown and described herein.
Figure 15C:
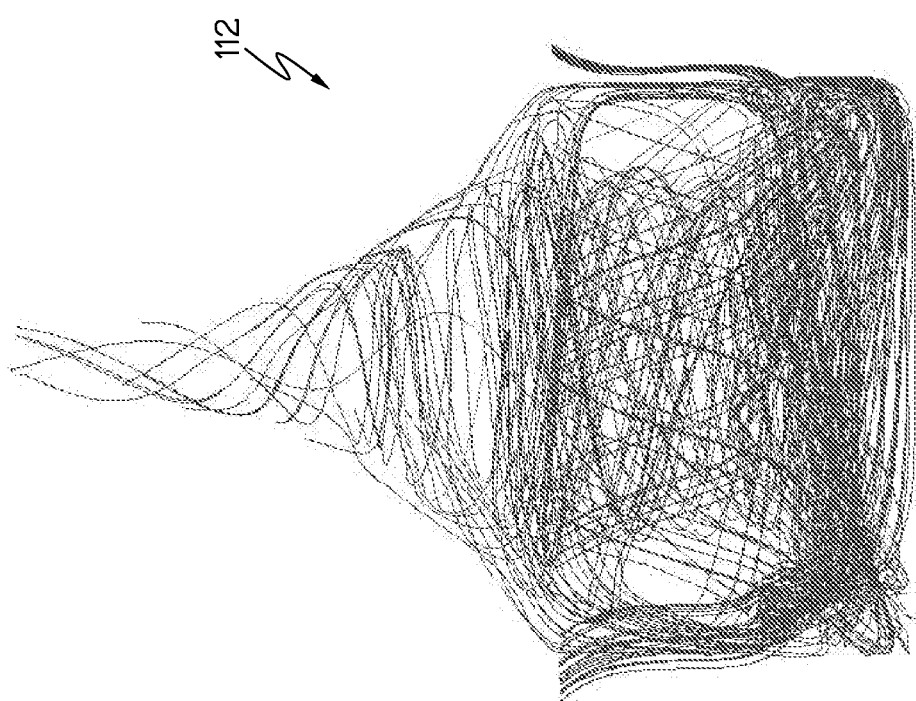
FIG. 15C schematically depicts a turbulence diagram of the extraction housing of FIG. 15A, according to one or more embodiments shown and described herein.

FIG. 15C generally depicts a gas flow diagram of fluid flowing into the turbulence chamber 112. As noted above, a vacuum pump 101 (not shown) may be fluidically coupled to the vacuum port 1026 formed in the top wall 1022. FIG. 15D depicts an interior view of the top wall 1022, from this perspective in can be seen that top wall 1022 may define a swirled funnel shape (e.g., with a swirl angle, α, between about 0 degrees and about 90 degrees, such as about 60 degrees). The swirled funnel shape of the top wall 1022 may, in combination with the angled impingement from the sidewall fluid flow channels 1018, cause a turbulent funnel-like flow, depicted in FIG. 15C, within the turbulence chamber 112 which pushes entrained powder through the vacuum port 1026 of the top wall 1022.

It is noted that, and as with any of the embodiments described herein, upon turning on the vacuum pump 101 the suction through the extraction housing 1010 may push the extraction housing 1010 down onto the build module 104 and seal the extraction housing 1010 to the build module 104.

It is noted than in any of the embodiments described herein, the various flow channels may be optimized to provide desired flow parameters through the housing. For example, embodiments as described herein may provide powder removal rates of up to about powder removal rate of up to 10 kg/minute, though faster or slower powder removal rates are contemplated and possible. For example, in some embodiments, powder removal rates may be greater than or equal to 1 kg/minute, 3 kg/minute, 5 kg/minute, etc. Accordingly, embodiments as described herein may improve processing rates to remove loose powder from a build module 104 and lead to increased manufacturing efficiency.

Figure 16:
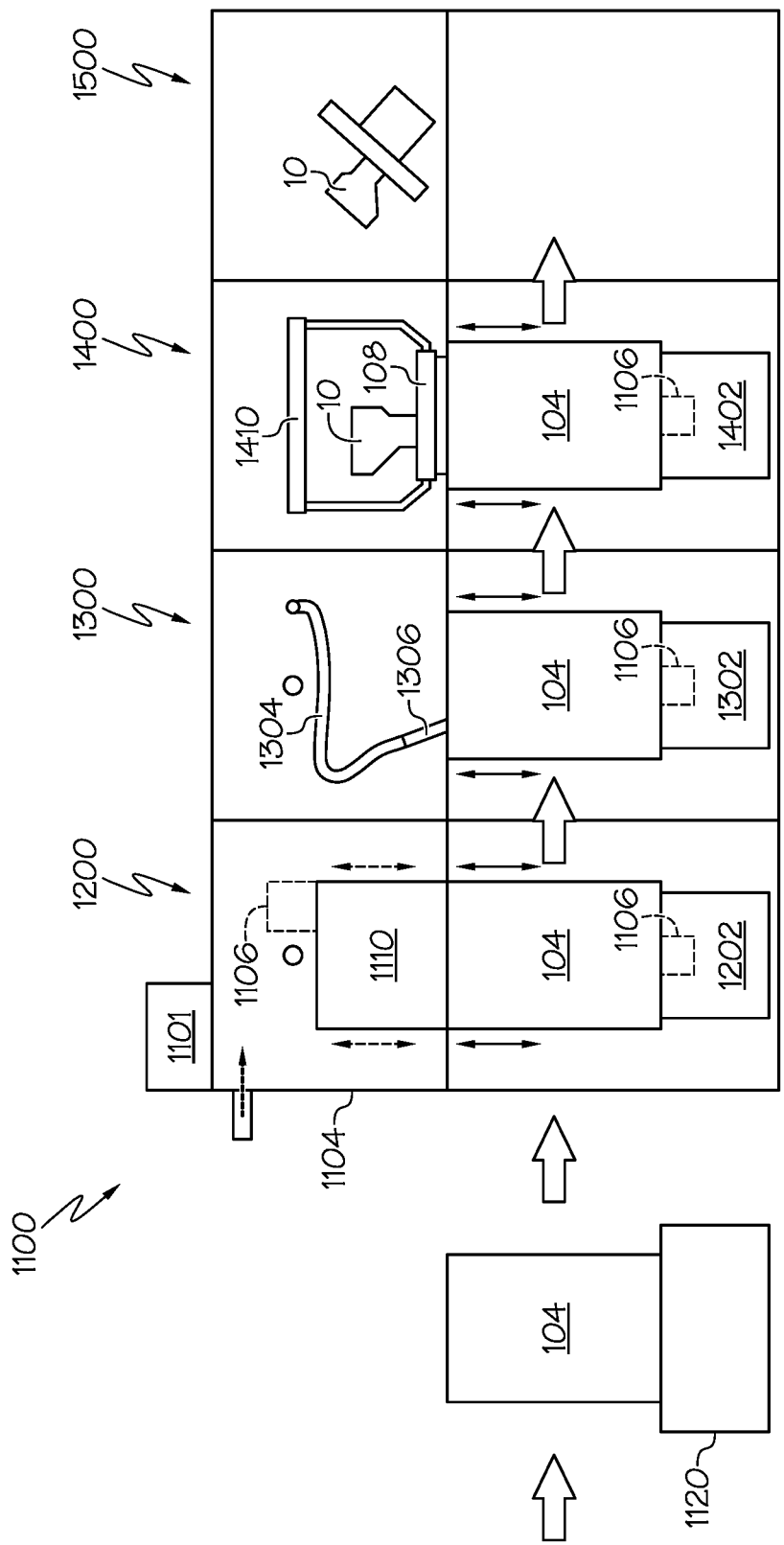
FIG. 16 schematically depicts an automated powder removal system, according to one or more embodiments shown and described herein.

Referring now to FIG. 16, a system 1100 for powder removal from a build module 104 and/or a printed object 10 is schematically depicted. Generally, the system 1100 may include a control unit 1101 which comprises any number of processors, memories, etc. to perform automated powder extraction. For example, the control unit 1101 may include a computer operable to process machine readable instructions to determine and execute process steps for automated powder removal. The control unit 1101 may be communicatively coupled to the various components of the system 1100. That is the control unit 1101 and the various components may send and/or receive electronic signals from one another via any wired and/or wireless communications.

The processor(s) of the control unit 1101 may include any device capable of executing machine-readable instructions (e.g., a controller, an integrated circuit, a microchip, a computer, or any other computing device). The memory(ies) may be communicatively coupled to the processor(s) over a communication path. The memory(ies) may store machine-readable instructions to perform automated powder removal. The memory(ies) may comprise RAM, ROM, flash memories, hard drives, or any non-transitory memory device capable of storing machine-readable instructions such that the machine-readable instructions can be accessed and executed by processor(s) of the control unit 1101. The machine-readable instructions may comprise logic or algorithm(s) written in any programming language of any generation (e.g., 1GL, 2GL, 3GL, 4GL, or 5GL) such as, for example, machine language that may be directly executed by the processor(s) of the control unit 1101, or assembly language, object-oriented programming (OOP), scripting languages, microcode, etc., that may be compiled or assembled into machine-readable instructions and stored in the memory(ies) of the control unit 1101. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The various components of the system 1100 may be communicatively coupled to one another over a communication path (not shown). The communication path may be formed from any medium that is capable of transmitting a signal such as, for example, conductive wires, conductive traces, optical waveguides, or the like. Moreover, the communication path may be formed from a combination of mediums capable of transmitting signals. In one embodiment, the communication path comprises any combination of conductive traces, conductive wires, connectors, and buses that cooperate to permit the transmission of electrical data signals to components such as processors, memories, sensors, actuators, etc. Accordingly, the communication path may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging data signals with one another such as, for example, electrical signals via conductive medium, electromagnetic signals via air, optical signals via optical waveguides, and the like.

In embodiments, the system 1100 may further include one or more stations to perform powder removal and/or part extraction. For example, the powder removal system 1100 may include an automatic powder removal station 1200, a manual powder removal station 1300, a part removal station, 1400 and/or a final powder removal station 1500. Each of the stations and their associated components may be communicatively coupled to the control unit 1101 via any wired and/or wireless communication protocols. A greater or fewer number of stations may be included without departing from the scope of the present disclosure. In some embodiments, one or more of these stations may be integrated into a single station and/or within an additive manufacturing machine such that the processes conventionally associated with each of these stations can be carried out without relocating the build module 104 and/or printed object 10.

In embodiments in which the various stations are separate stations (e.g., are located at different locations), the build module 104 and/or the printed object 10 may be moved to and/or between the one or more stations. For example, the build module 104 containing the printed object 10 and powder may be moved from an additive manufacturing machine (not shown) to the automated powder removal station 1200, to the manual powder removal station 1300, to the part removal station 1400, and/or to the final powder removal station 1500. In such embodiments, the powder removal system 1100 may include one or more transfer devices 1120 communicatively coupled to the control unit 1101. The one or more transfer devices 1120 may include any number of actuators, robots, autonomous vehicles or the like configured to transfer a build module 104 and/or the printed article 10 between the various stations and/or from an additive manufacturing machine (not shown). For example, the one or more transfer devices 1120 may be controlled via the control unit 1101 to transfer the build module 104 and/or the printed article 10 from one station to the next. In some embodiments, each station may include one or more transfer devices 1120 that transfer the build module 104 and/or the printed article 10 from its present station to the next.

Figure 17:
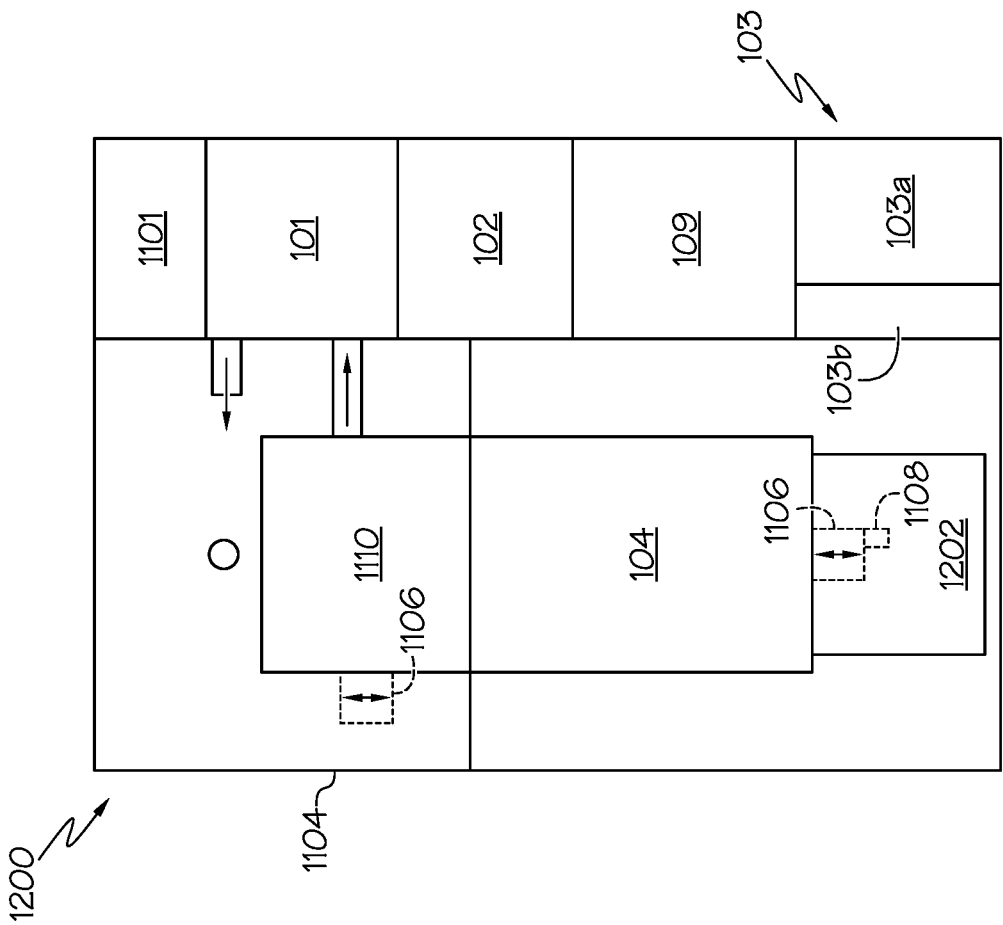
FIG. 17 schematically depicts an automated powder removal station of the automated powder removal system of FIG. 16, according to one or more embodiments shown and described herein.

Referring now to FIG. 17, the powder removal station 1200 is schematically depicted with some additional detail. The powder removal station 1200 may comprise a dock 1202 for receiving the build module 104, an environment containment housing 1104, an extraction housing 1110, one or more positioning actuators 1106, one or more vacuum pumps 101, a powder separator 102, a sieve 109, and/or a powder container 103. It is noted that the extraction housing 1110 may be equivalent or interchangeable with any of the extraction housings described herein.

In embodiments, the dock 1202 may be sized and shaped to receive and support the build module 104, which may initially still contain powder and the printed article. In embodiments, the dock 1202 may be a platform upon which the build module 104 may be positioned for alignment with the extraction housing 110. In some embodiments, the dock 1202 may comprise one or more of the one or more positioning actuators 1106 for positioning the build module 104 relative to the extraction housing 1110. In some embodiments, for example, linear actuators, rotational actuators or the like may be included as the one or more positioning actuators 1206 for positioning the build module 104 as desired. In some embodiments, the one or more positioning actuators 1206 may include a movable build plate actuator configured to engage the moveable build plate of the build module 104, as described above, to move moveable build plate up and/or down during powder extraction. The one or more positioning actuators, may each be communicatively coupled to the control unit 1101, such that the control unit 1101 may control the one or more positioning actuators 1206 to effectuate powder removal.

The extraction housing 1110 may be positioned within the environment containment housing 1104 which provides a gas tight chamber to maintain an inert environment within the build module 104 and extraction housing 1110. As described above, the extraction housing 1110 may be fluidically coupled to the vacuum pump 101, such that operation of the vacuum pump 101 allows the extraction housing 1110 to extract one or more fluid streams with entrained powder from the extraction housing. The vacuum pump 101 may recirculate the gas through the environment containment housing 1104 to maintain the inert environment. One or more positioning actuators 1106 may be coupled to the extraction housing 1110, for example, any number of linear and or rotational actuators may be provided to align the extraction housing with the build module 104 as described herein. Accordingly, during extraction, the control unit 1101 may operate the one or more positioning actuators 1106 to position the extraction housing relative to the build module 104, e.g., over the build module 104, as described herein. Once in position, the control unit 1101 may operate the vacuum pump 101 to remove powder from the build module 104. The removed powder may be separated from the fluid stream with the powder separator 102 and then be sieved with the sieve 109, and separated into the powder container 103 which may include separate containers for powder which may be recycled (e.g., container 103*a*) and powder which is to be disposed of (e.g., container 103*b*).

In some embodiments, one or more sensors 1108 or timers may be communicatively coupled to the control unit 1101 to allow the control unit to determine when powder extraction at the powder removal station 1200 is complete. For example, the one or more sensors 1108 may include weight sensors mounted to the dock. Logic executed by the control unit 1101 or input via a user input device may allow the system to determine a combined weight of the printed article(s) and the build module 104, to determine how much weight is powder. Accordingly, powder removal may be continued until the weight is reduced by the estimated weight of the powder. In some embodiments, other sensors (e.g., optical sensors) may be used within the build module 104 to identify whether powder removal has been completed.

Referring back to FIG. 16, once powder removal is complete, or at least a portion of the powder has been removed from the build module, at the automated powder removal station 1200, the build module 104 may be transferred, via the control unit 1101 with the one or more transfer devices 1120 to the manual powder removal station 1300 or another station, such as the part removal station 1400. The manual powder removal station 1300 may include a window (not shown), a glove system for the operator (not shown), and/or a manual vacuum hose 1304 and suction nozzle 1306 for removing remaining loose powder. In some embodiments, the manual powder removal station may also include a dock 1302, similar to dock 1202 described above. For example, the dock 1302 may comprise one or more of the one or more positioning actuators 1106 for positioning the build module 104 and/or the moveable build plate 108 to accommodate manual powder extraction. For example, it is contemplated that the manual powder removal station 1300 may include one or more user input devices (e.g., buttons, microphones, touchscreens, toggles, etc.) communicatively coupled to the control unit 1101 to allow an operator to input instructions to position the build module 104 as desired during manual powder removal.

In some embodiments, the manual powder removal station 1300 may be combined with the automated powder removal station 1200 into a single station. For example, both the extraction housing 1110 and the manual vacuum hose 1304 and suction nozzle 1306 may be positioned within the combined powder removal station. Similarly, the combined powder removal station may include a viewing window and/or a glove system to be used by the operator for reaching into the powder removal station.

After manual powder removal, the build module 104 may be moved (e.g., with one or more transfer devices 1120) to a part removal station 1400. Similar to the powder removal stations 1200, 1300, the part removal station 1400 may comprise a dock 1402 having one or more actuators 1106 operable to raise and/or lower the moveable build plate 108. A removal device 1410, e.g., a robotic arm, clamp, or the like may be controlled via the control unit 1101 (and/or via user inputs to a user input device) to engage the printed article 10 or the moveable build plate 108 and remove the printed object 10 from the build module 104. At this point the printed article 10 may then be moved to the final powder removal station 1500, which may use any combination of vibration, rotation, directed gas blowing, or the like to remove any remaining powder from the printed article 10.

Further aspects of the present disclosure are provided by the subject matter of the following clauses:

1. A powder removal assembly comprising: a build module comprising module sidewalls and a moveable build plate slidably coupled to the module sidewalls; and an extraction housing removably engaged with the module sidewalls of the build module and defining a turbulence chamber between the build module and the extraction housing, the extraction housing comprising: one or more sidewalls comprising one or more sidewall fluid flow channels extending through the one or more sidewalls; and a top wall coupled to the one or more sidewalls, wherein the one or more sidewall fluid flow channels extend from a position proximate a base of the one or more sidewalls to the top wall.

2. The powder removal assembly of any preceding clause, further comprising a vacuum pump fluidically coupled to a vacuum port formed within the top wall.

3. The powder removal assembly of any preceding clause, wherein the one or more sidewalls define one or more fluid inlets for channeling fluid from the one or more sidewall fluid flow channels into the turbulence chamber.

4. The powder removal assembly of any preceding clause, wherein the extraction housing comprises: a plurality of tubes coupled to the top wall and extendable in a direction into and out of the turbulence chamber.

5. The powder removal assembly of any preceding clause, wherein at least a portion of the plurality of tubes are configured to deliver one or more fluid streams into the turbulence chamber.

6. The powder removal assembly of any preceding clause, wherein: the top wall comprises a plurality of converging flow channels defining a vacuum outtake manifold; and the one or more sidewall fluid flow channels are fluidicly coupled to at least one of the plurality of converging flow channels.

7. The powder removal assembly of any preceding clause, wherein each of the plurality of tubes extends through the top wall at a position between the plurality of converging flow channels.

8. The powder removal assembly of any preceding clause, wherein the plurality of tubes are telescoping tubes.

9. A powder removal assembly comprising: an extraction housing configured to be arranged on or within a build module to define a turbulence chamber between the build module and the extraction housing and to define one or more fluid flow channels for removal of one or more fluid streams within the turbulence chamber, the extraction housing comprising a top wall; and a plurality of tubes slidably coupled to the top wall so as to be slidable in a direction into and out of the turbulence chamber.

10. The powder removal assembly of any preceding clause, wherein at least a portion of the plurality of tubes defines a flow path for channeling the one or more fluid streams into the turbulence chamber.

11. The powder removal assembly of any preceding clause, wherein the extraction housing further comprises one or more sidewalls, each of the one or more sidewalls comprising one or more sidewall fluid flow channels encased within the one or more sidewalls.

12. The powder removal assembly of any preceding clause, wherein: the top wall comprising a plurality of converging flow channels defining a vacuum outtake manifold; and the one or more sidewall fluid flow channels are fluidicly coupled to the vacuum outtake manifold.

13. The powder removal assembly of any preceding clause, wherein a portion of the one or more sidewall fluid flow channels are configured to deliver one or more fluid streams into the turbulence chamber.

14. The powder removal assembly of any preceding clause, wherein the extraction housing comprises a lip configured to maintain a position of the extraction housing relative to the build module.

15. An automated powder removal system comprising: a build module for additive manufacturing; and an automated powder removal station operable to receive the build module, the automated powder removal station comprising: an extraction housing configured to be engaged with the build module and remove powder from the build module; one or more positioning actuators configured to align the extraction housing and the build module with one another; a vacuum pump operatively coupled to the extraction housing; and a control unit communicatively coupled to the vacuum pump and the one or more positioning actuators, wherein the control unit: causes the one or more positioning actuators to align the extraction housing with the build module; and automatically operates the vacuum pump to cause the powder to be removed from the build module through the extraction housing.

16. The automated powder removal system of any preceding clause, further comprising: one or more transfer devices communicatively coupled to the control unit; and at least one of a manual powder removal station and a part removal station, wherein the control unit is configured to operate the one or more transfer devices to transfer the build module from the automated powder removal station to the at least one of the manual powder removal station and the part removal station after at least a portion of the powder is removed from the build module.

17. The automated powder removal system of any preceding clause, wherein the extraction housing defines a turbulence chamber between the build module and the extraction housing and defines one or more fluid flow channels for removal of one or more fluid streams within the turbulence chamber.

18. The automated powder removal system of any preceding clause, wherein the extraction housing comprises: one or more sidewalls comprising one or more sidewall fluid flow channels; and a top wall coupled to the one or more sidewalls, wherein the one or more sidewall fluid flow channels extend from a position proximate a base of the one or more sidewalls to the top wall.

19. The automated powder removal system of any preceding clause, wherein the one or more sidewalls comprise one or more fluid inlets for channeling fluid from the one or more sidewall fluid flow channels into the turbulence chamber.

20. The automated powder removal system of any preceding clause, wherein the one or more fluid flow channels comprises a plurality of fluid inlet channels and a plurality of fluid outlet channels.

It should now be understood embodiments described herein are directed to powder removal systems and assemblies. The powder removal systems and assemblies may generally be incorporated into additive manufacturing assemblies and procedures to improve removal of unbound powder from a powder bed of a build module and from a build. For example, embodiments may include an extraction housing that engages the side walls of a build module to define a turbulence chamber between the build module and the extraction housing. Various fluid flow channels provided via the extraction housing may be used to direct one or more fluid streams into and out of the turbulence chamber to disturb unbound powder, entrain the unbound powder within one or more fluid streams, and remove the unbound powder from the turbulence chamber/build module. Such removal may be automated as part of an automated powder removal system. Accordingly, systems and assemblies as described herein improve powder removal procedures by, for example, decreasing powder removal time, limiting powder and/or part exposure to external contaminants, etc., thereby improving additive manufacturing efficiency and/or quality.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A powder removal system comprising:
   a build module comprising module sidewalls and a moveable build plate slidably coupled to the module sidewalls; and
   an extraction housing removably engaged with the module sidewalls of the build module, the extraction housing comprising:
      one or more sidewalls comprising one or more sidewall fluid flow channels extending through the one or more sidewalls of the extraction housing; and
      a top wall coupled to the one or more sidewalls of the extraction housing, wherein the one or more sidewall fluid flow channels extend from a position proximate a base of the one or more sidewalls of the extraction housing to the top wall,
      wherein the extraction housing defines a turbulence chamber between the moveable build plate of the build module, the one or more sidewalls of the extraction housing, and the top wall of the extraction housing.

2. The powder removal system of claim 1, further comprising a vacuum pump fluidically coupled to a vacuum port formed within the top wall.

3. The powder removal system of claim 2, wherein the one or more sidewalls of the extraction housing define one or more fluid inlets for channeling fluid from the one or more sidewall fluid flow channels into the turbulence chamber.

4. The powder removal system of claim 1, wherein the extraction housing comprises:
   a plurality of tubes coupled to the top wall and extendable in a direction into and out of the turbulence chamber.

5. The powder removal system of claim 4, wherein at least a portion of the plurality of tubes are configured to deliver one or more fluid streams into the turbulence chamber.

6. The powder removal system of claim 4, wherein:
   the top wall comprises a plurality of converging flow channels defining a vacuum outtake manifold; and
   the one or more sidewall fluid flow channels are fluidically coupled to at least one of the plurality of converging flow channels.

7. The powder removal system of claim 6, wherein each of the plurality of tubes extends through the top wall at a position between the plurality of converging flow channels.

8. The powder removal system of claim 4, wherein the plurality of tubes are telescoping tubes.

9. The powder removal system of claim 1, wherein the extraction housing comprises a lip configured to maintain a position of the extraction housing relative to the build module.

10. The powder removal system of claim 1, further comprising:
an automated powder removal station operable to receive the build module, the automated powder removal station comprising:
the extraction housing;
one or more positioning actuators configured to align the extraction housing and the build module with one another;
a vacuum pump operatively coupled to the extraction housing; and
a control unit communicatively coupled to the vacuum pump and the one or more positioning actuators, wherein the control unit:
causes the one or more positioning actuators to align the extraction housing with the build module; and
automatically operates the vacuum pump to cause the powder to be removed from the build module through the extraction housing.

11. The powder removal system of claim 10, further comprising:
one or more transfer devices communicatively coupled to the control unit; and
a manual powder removal station, wherein the control unit is configured to operate the one or more transfer devices to transfer the build module from the automated powder removal station to the manual powder removal station after at least a portion of the powder is removed from the build module.

12. The powder removal system of claim 10, further comprising one or more sensors communicatively coupled to the control unit to enable the control unit to determine when powder extraction at the automated powder removal station is complete.

13. The powder removal system of claim 12, wherein the one or more sensors comprise weight sensors.

14. The powder removal system of claim 10, further comprising a dock operable to receive the build module and having one or more actuators operable to raise and/or lower the moveable build plate.

15. The powder removal system of claim 10, further comprising:
one or more transfer devices communicatively coupled to the control unit; and
a part removal station, wherein the control unit is configured to operate the one or more transfer devices to transfer the build module from the automated powder removal station to the part removal station after at least a portion of the powder is removed from the build module.

16. The powder removal system of claim 1, wherein the one or more sidewall fluid flow channels comprises a plurality of fluid inlet channels and a plurality of fluid outlet channels.

17. The powder removal system of claim 1, further comprising:
an automatic powder removal station operable to receive the build module.

18. The powder removal system of claim 1, further comprising:
a manual powder removal station operable to receive the build module.

19. The powder removal system of claim 1, further comprising:
a final powder removal station operable to receive the build module.

20. The powder removal system of claim 1, further comprising:
a part removal station operable to receive the build module.

* * * * *